United States Patent
Suenaga et al.

[11] Patent Number: 5,940,220
[45] Date of Patent: Aug. 17, 1999

[54] MICROSCOPE OBJECTIVE LENS WITH VARIABLE CORRECTION OF ABERRATIONS IMPARTED BY TRANSPARENT BODY BETWEEN THE SPECIMEN AND THE OBJECTIVE LENS

[75] Inventors: Yutaka Suenaga, Yokohama; Masayuki Mizusawa, Kawasaki, both of Japan

[73] Assignee: Nikon Corporation, Tokyo, Japan

[21] Appl. No.: 08/958,748

[22] Filed: Oct. 31, 1997

[30] Foreign Application Priority Data

Nov. 8, 1996 [JP] Japan ................................. 8-311188

[51] Int. Cl.$^6$ .................................................. G02B 21/02
[52] U.S. Cl. .................................................. 359/660
[58] Field of Search ....................... 359/656–661

[56] References Cited

U.S. PATENT DOCUMENTS 5,270,860  12/1993  Suzuki ................................. 359/660

*Primary Examiner*—Georgia Epps
*Assistant Examiner*—Michael Lucas

*Attorney, Agent, or Firm*—Klarquist Sparkman Campbell Leigh & Whinston, LLP

[57] ABSTRACT

Microscope objective lenses are disclosed that comprise an axially movable second lens group for correcting aberrations that arise with changes in the thickness of a cover glass or other transparent body situated between the specimen and the objective lens. An objective lens according to one aspect of the invention comprises, in order from the specimen side, first, second, third, and fourth lens groups. The first lens group is positive and comprises a negative lens cemented to a positive lens, the positive lens having a convex surface facing the specimen side. The second lens group is positive and comprises a cemented lens having a cemented surface having negative refractive power. The third lens group is positive and causes a ray bundle from the specimen, propagating divergently from the specimen, to converge toward the optical axis. The fourth lens group is negative and comprises a positive lens cemented to a negative lens, the negative lens having a concave surface facing the image side. Moving the second lens group on the optical axis allows correction of aberrations imparted by a transparent body between the specimen and the objective lens. The objective lens satisfies one or more conditional expressions.

20 Claims, 19 Drawing Sheets

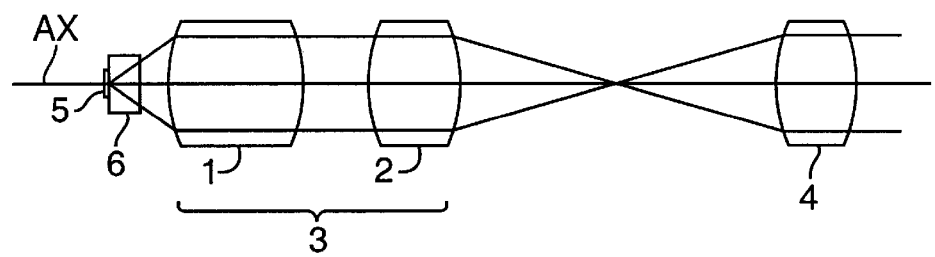
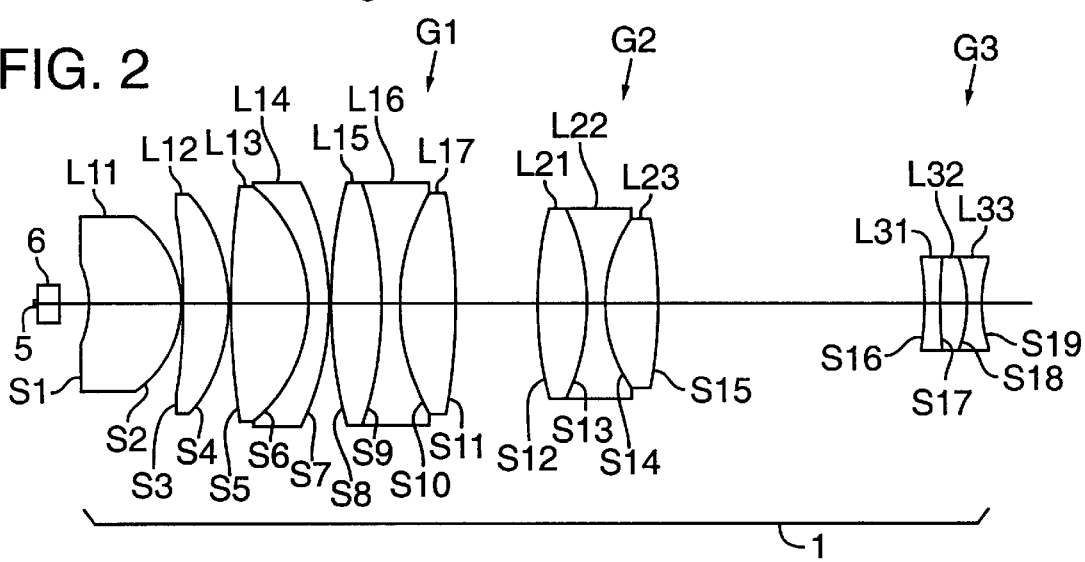

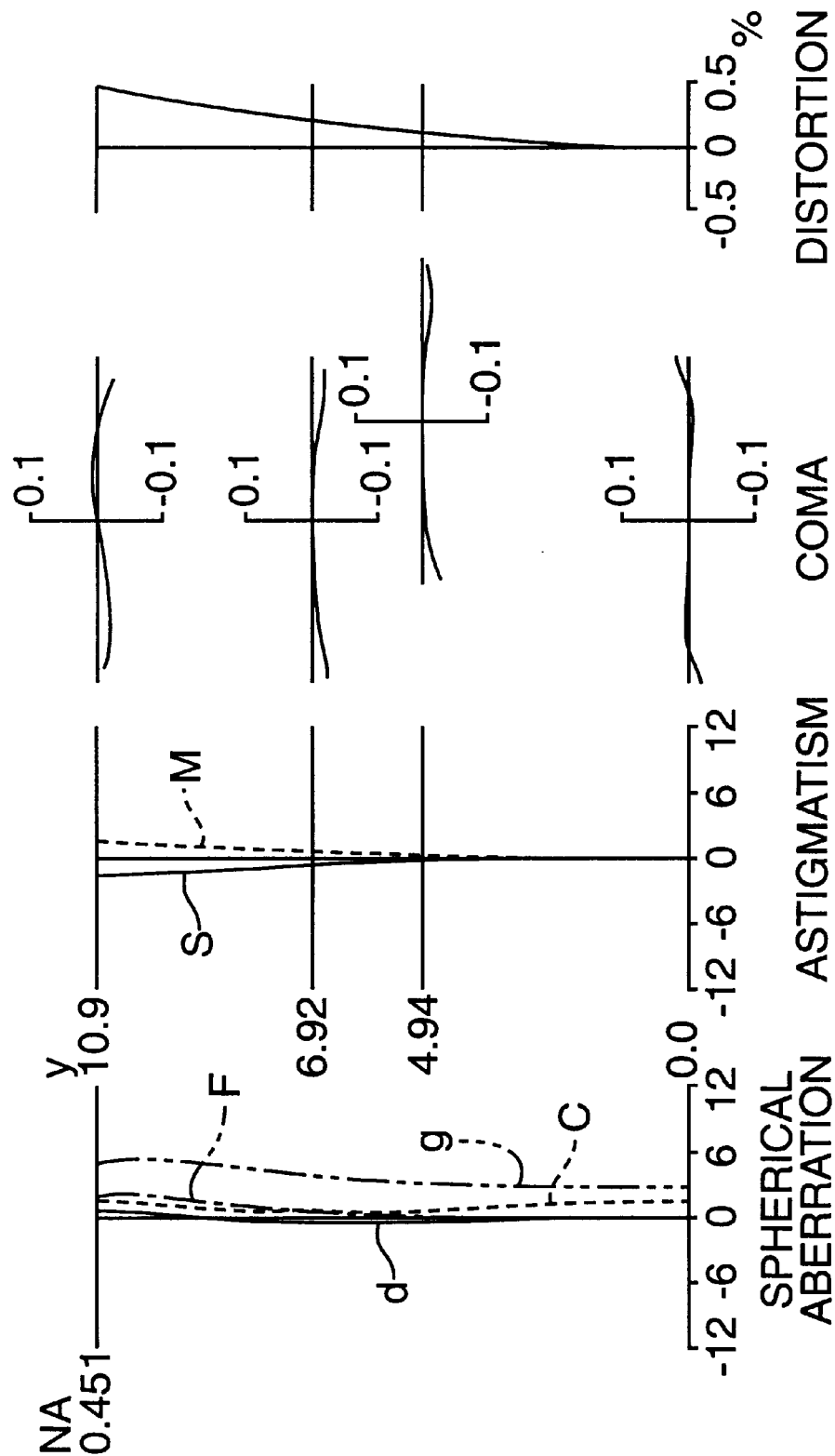

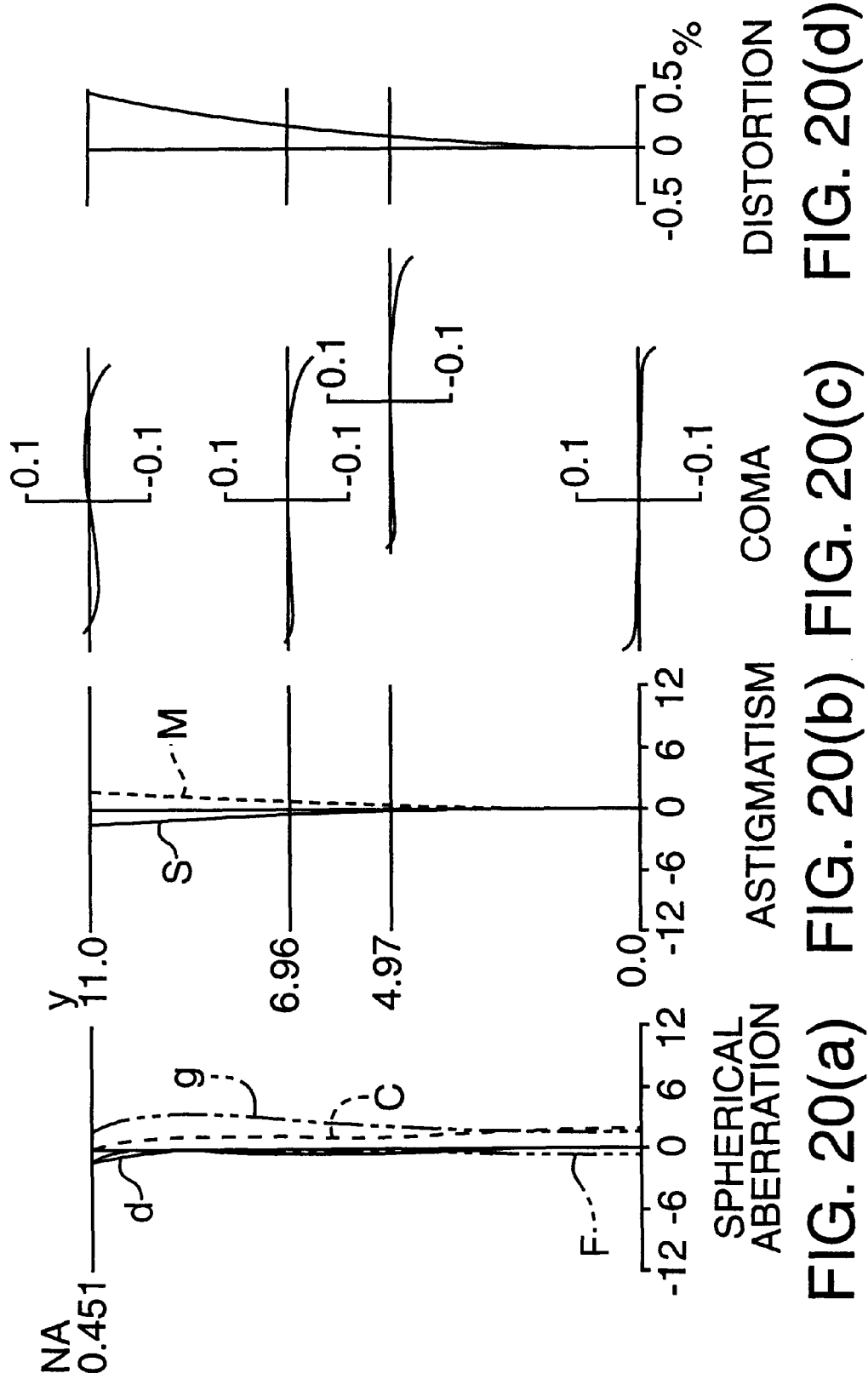

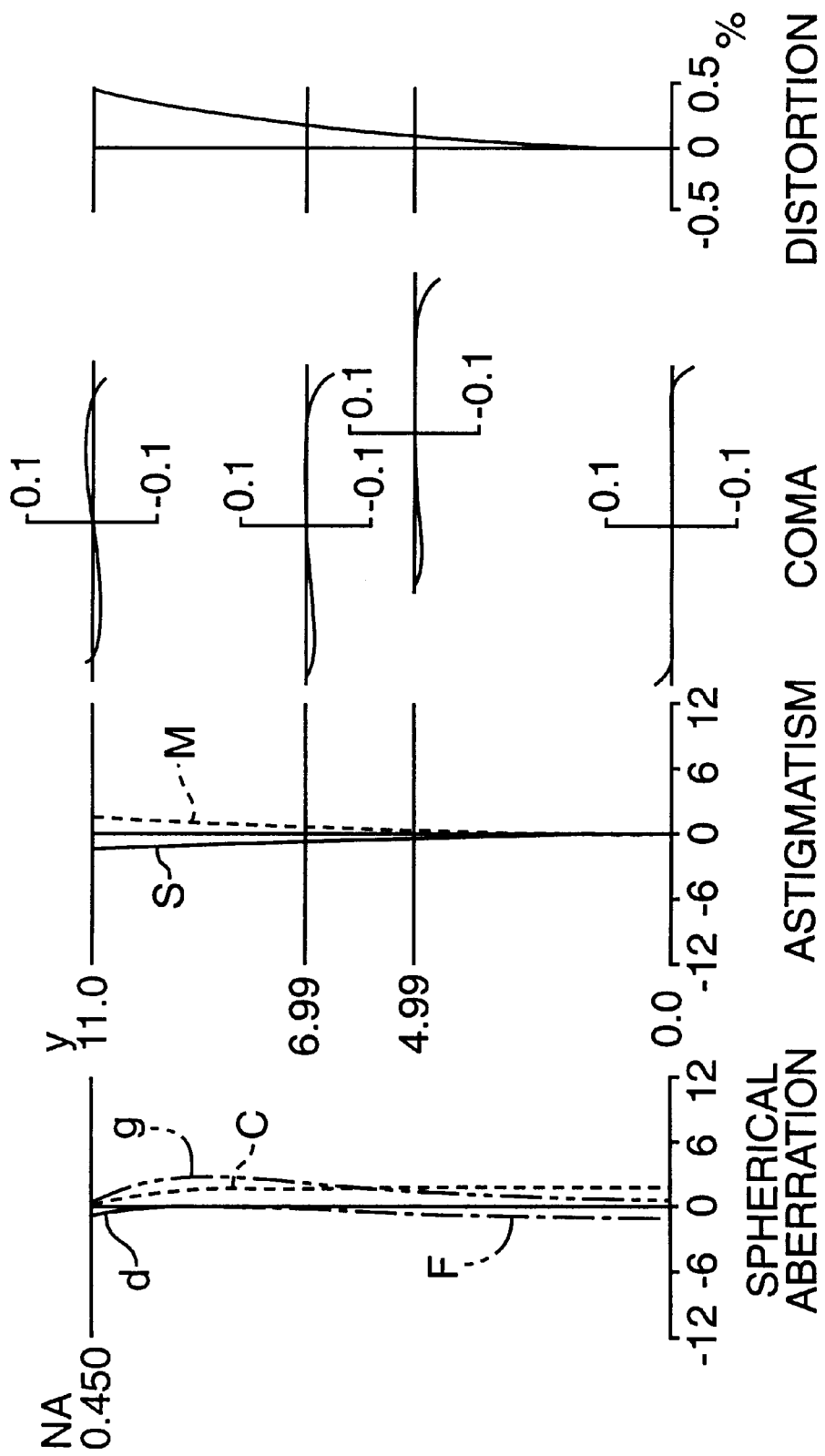

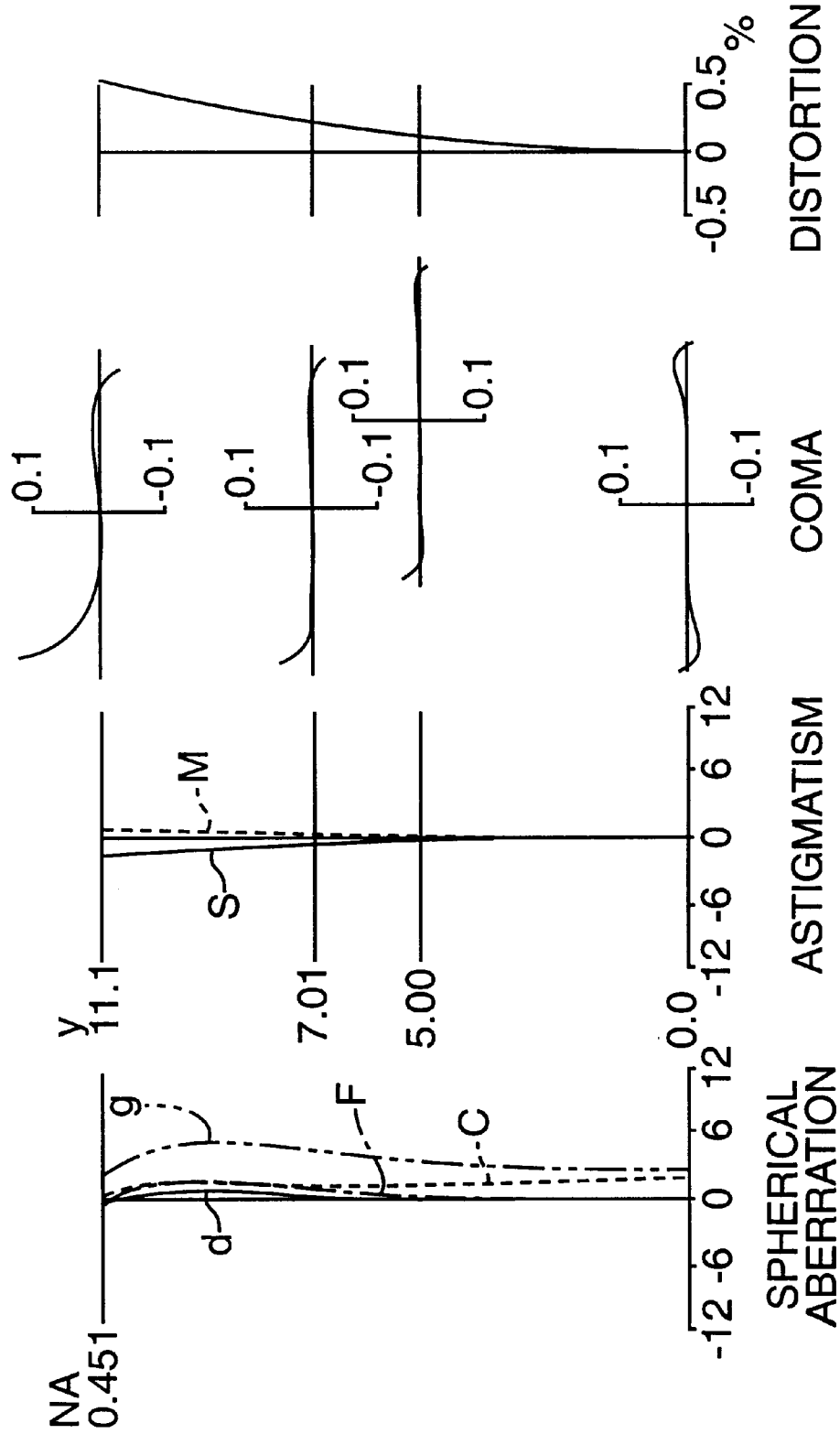

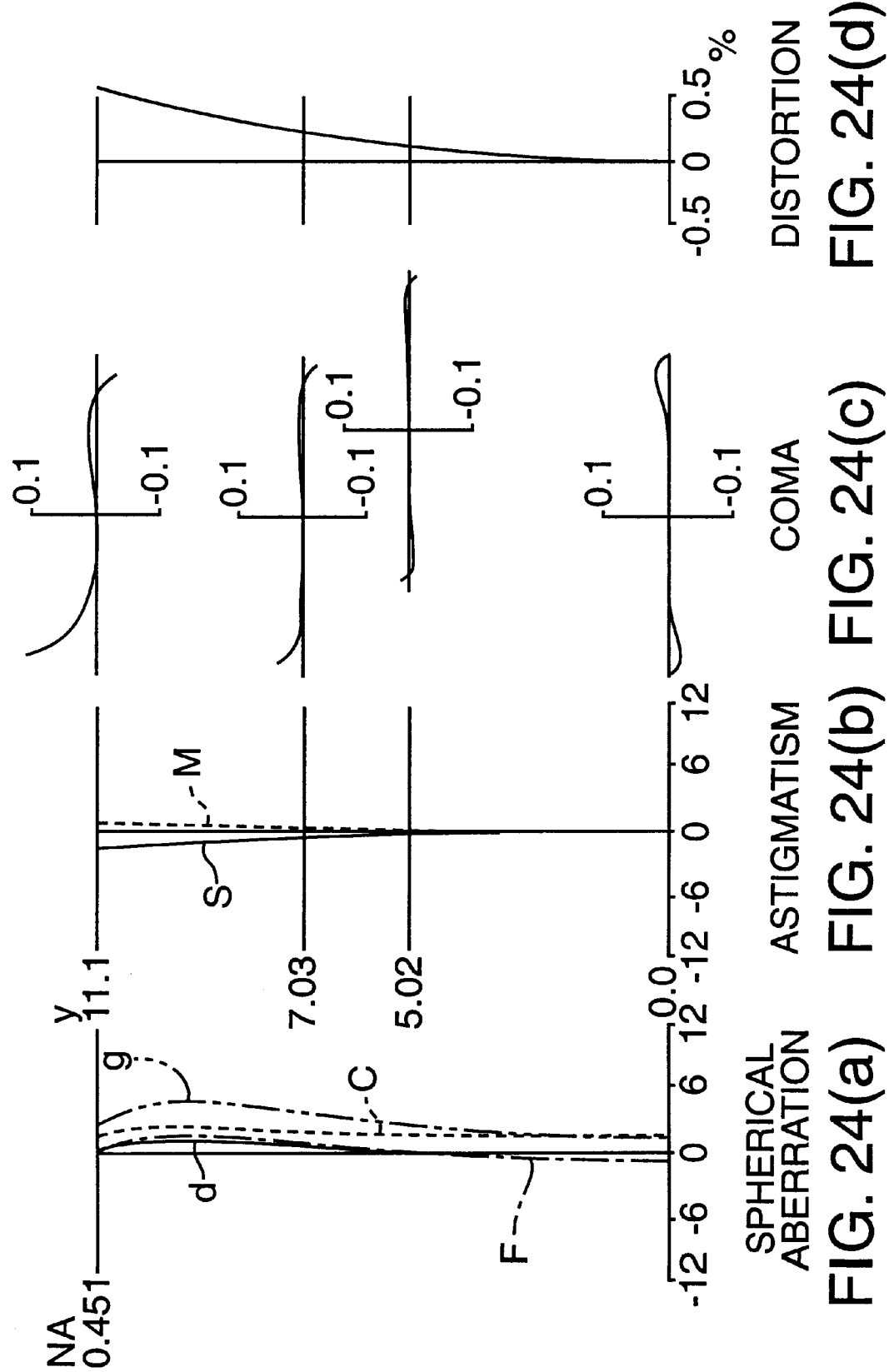

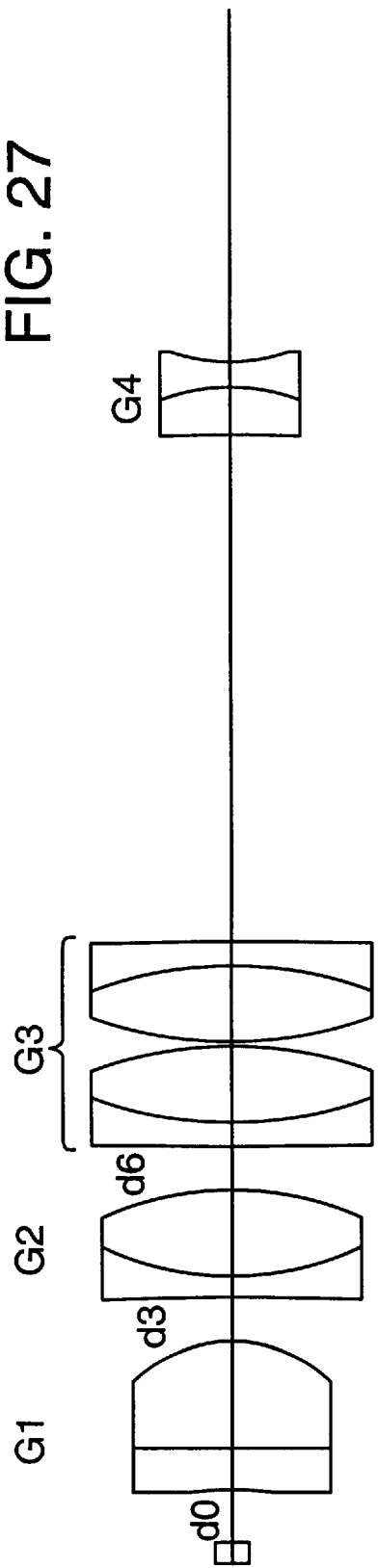

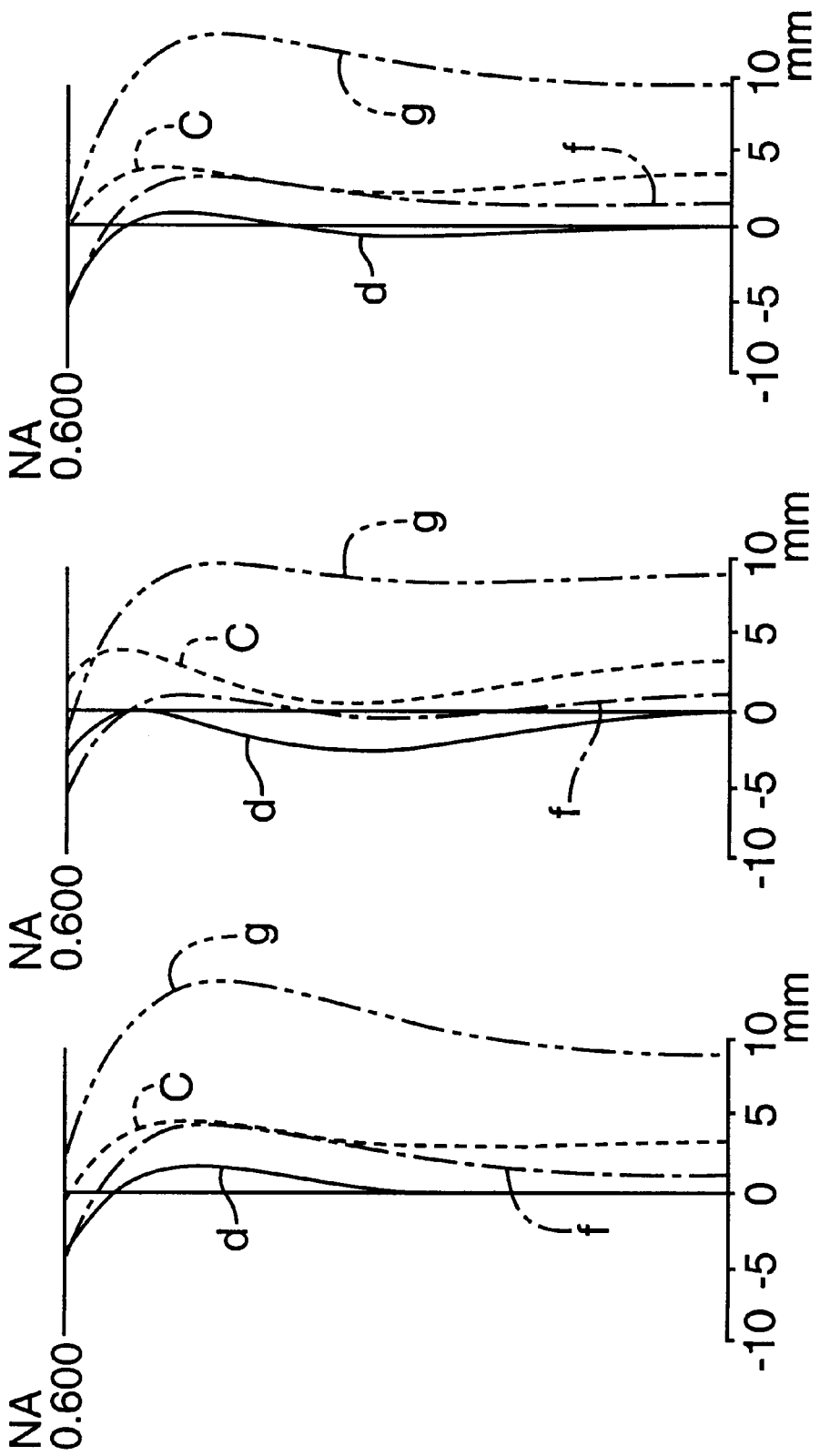

MICROSCOPE OBJECTIVE LENS WITH VARIABLE CORRECTION OF ABERRATIONS IMPARTED BY TRANSPARENT BODY BETWEEN THE SPECIMEN AND THE OBJECTIVE LENS

FIELD OF THE INVENTION

This invention pertains to microscope objective lenses. More specifically, the invention pertains to objective lenses that can correct various lens aberrations arising during a change in the thickness of an optically transparent body (e.g., cover glass, culture dish, or the like) placed between a specimen being examined using the microscope and the objective lens.

BACKGROUND OF THE INVENTION

Many microscopes are designed based on the assumption that the specimen to be examined is situated such that a transparent body (such as a cover glass or a culture dish, wall of a plastic or glass petri dish, and/or a liquid) is situated between the specimen and the microscope objective lens. Certain microscope objective lenses are designed for a particular range of thickness and refractive index of the transparent body. The design criteria include control of aberrations that could arise within the specified range of thickness and refractive index of the transparent body.

Specifications for microscopes used in biotechnology disciplines such as cell culture and genetic engineering have been changing rapidly in pace with the remarkable progress in these sciences. A popular type of microscope used in these sciences is the inverted microscope in which the specimen is viewed from underneath the dish or plate holding the specimen. Inverted microscopes require objective lenses exhibiting a long working distance (i.e., axial distance from the distal end of the objective lens to the surface of the specimen). Also, the specimen is observed through the under-surface of the dish or plate holding the specimen. Unfortunately, the thickness of glass and plastic dishes (i.e., the "transparent body" discussed above) can vary widely. Aberrations are inevitably generated by the transparent body that can cause degradations in the imaging performance of the inverted microscope.

Conventional objective lenses for use under such conditions typically have a specified (but relatively narrow) range of working distance and refractive index of the transparent body with which the lens can be used. Unfortunately, if the transparent body actually used has a refractive index and/or thickness that is out of range for the objective lens, a substantially degraded imaging performance will be evident. The magnitude of the degraded performance tends to be greater at a larger numerical aperture (NA) of the objective lens.

Certain conventional microscope objective lenses include movable lens groups inside the objective lens to compensate for variations in the thickness of the transparent body, thereby providing some correction of aberrations introduced by the transparent body. Conventional objective lenses intended for use with an inverted microscope used for examining cell-culture specimens typically have larger correction ranges for certain aberrations than objective lenses used with a non-inverted microscope. This is because cell- or tissue-culture dishes are produced in a wide variety of shapes, materials, and thicknesses, and even a population of the same type of dish from a manufacturer can vary significantly from one dish to the next.

Examples of microscope objective lenses useful for the inverted microscope are disclosed in Japanese Kokai (Laid-Open) Patent Document No. 100409 (1984) and Kokai Patent Document No. 2005521 (1985). The objective lenses disclosed in these documents comprise a movable lens group permitting manipulation of a lens spacing inside the objective lens to compensate for a range of variations in the thickness and refractive index of a wall of the culture dish. These lenses also have a comparatively large working distance and exhibit a certain correction capability for spherical aberrations. However, these lenses exhibit problems such as inferior correction of coma aberration and an unstable imaging performance around the periphery of the field of view.

Another conventional microscope objective lens is disclosed in Japanese Kokai Patent Document No. Hei 3-50517 (1991). This lens has a large numerical aperture (NA), exhibits a large working distance, and can favorably compensate for changes in aberrations caused by certain changes in the thickness of the culture dish or other transparent body. This lens comprises a second lens group that can axially move relative to the first and third lens groups for aberration correction. Unfortunately, the movable second lens group comprises a large number of lens components, making the objective lens complicated and expensive. More specifically, the second lens group is divided into multiple subgroups that are movable relative to each other. The resulting numerous degrees of freedom of movement, while useful for correcting aberrations, requires a complicated movement mechanism, which is expensive.

Other conventional microscope objective lenses are disclosed in Japanese Kokai Patent Document No. Sho 56-142508 and Japanese Kokai Patent Document No. Sho 60-260016. These lenses have a movable second lens group used for effecting a degree of aberration correction. However, the refractive power of the second lens group of the objective lens of the 56-142508 document is too strong; whenever the second group moves, the focal length of the entire objective lens changes. In other words, magnification fluctuations are evident during use of such an objective lens. The same problem exists with the objective lenses of the 60-260016 document.

SUMMARY OF THE INVENTION

In view of the foregoing, an object of the present invention is to provide a microscope objective lens having a large numerical aperture, a large working distance, and a movable lens group having a simple configuration to correct aberrations arising from variations in the thickness of the transparent body, while exhibiting favorable correction of various aberrations over the entire correction range and stable imaging performance.

According to a first aspect of the invention, a microscope objective lens is provided that comprises, in order on an optical axis from the specimen side, first, second, third, and fourth lens groups.

The first lens group in an objective lens according to the first aspect of the invention has a positive refractive power. Such a first lens group preferably consists of a negative lens cemented to a positive lens, wherein the positive lens has a convex surface facing toward the image side.

The second lens group in an objective lens according to the first aspect of the invention has a positive refractive power and preferably comprises a cemented lens having a cemented surface having a negative refractive power. Such a second lens group more preferably consists of a negative lens cemented to a positive lens.

The third lens group in an objective lens according to the first aspect of the invention has a positive refractive power and is operable to cause a ray bundle from the specimen, propagating divergently from the second lens group, to converge toward the optical axis of the objective lens. Such a third lens group preferably comprises, from the specimen side, first and second cemented lenses, wherein the first cemented lens preferably consists of a negative lens cemented to a positive lens and the second cemented lens preferably consists of a positive lens cemented to a negative lens. Such a third lens group can also include an additional positive lens, preferably located toward the specimen side relative to the first cemented lens.

The fourth lens group in an objective lens according to the first aspect of the invention has a negative refractive power. Such a fourth lens group preferably consists of positive lens cemented to a negative lens, wherein the negative lens has a concave surface facing the image side.

Further according to the first aspect of the invention, the second lens group is movable on the optical axis relative to the first, second, third, and fourth lens groups in proportion to the thickness of an optically transparent body situated between the specimen and the first lens group so as to provide a correction of aberrations imparted by the transparent body.

The objective lens according to the first aspect of the invention also preferably satisfies the conditional expression:

$$8<|f_2/f|$$

wherein $f_2$ is the focal length of the second lens group and f is the focal length of the objective lens. Such an objective lens preferably also satisfies one or both the following conditional expressions:

$$60<V_{4n}$$

$$-7<f_4/f<13$$

wherein $V_{4n}$ is the Abbe number, relative to d-line light, of the negative lens of the fourth lens group, and $f_4$ is the focal length of the fourth lens group. Even more preferably, an objective lens according to this aspect of the invention satisfies one or more of the following additional conditional expressions:

$$-10<r_{1,1}/f<-2$$

$$|r_{2,1}|/f\geq10$$

wherein $r_{1,1}$ is the radius of curvature of the lens surface, of the negative lens in the first lens group, that is closest to the specimen side, and $r_{2,1}$ is the radius of curvature of the lens surface, in the second lens group, that is closest to the specimen side.

The foregoing and additional aspects, features, and advantages of the present invention will be more apparent from the following detailed description, which proceeds with reference to the accompanying drawings.

BRIEF DESCRIPTION OF THE DRAWINGS

FIG. 1 is a schematic optical diagram of a microscope including a first objective lens according to one aspect of the present invention.

FIG. 2 is a schematic optical diagram of Example Embodiment 1 of a first objective lens according to the invention.

FIGS. 19(a)–19(d) provide plots of spherical aberration, astigmatism, coma, and distortion for the objective lens of Example Embodiment 3 as used with a cover glass having zero thickness.

FIGS. 20(a)–20(d) provide plots of spherical aberration, astigmatism, coma, and distortion for the objective lens of Example Embodiment 3 as used with a cover glass having a thickness of 1.2 mm.

FIGS. 21(a)–21(d) provide plots of spherical aberration, astigmatism, coma, and distortion for the objective lens of Example Embodiment 3 as used with a cover glass having a thickness of 2 mm.

FIGS. 23(a)–23(d) provide plots of spherical aberration, astigmatism, coma, and distortion for the objective lens of Example Embodiment 4 as used with a cover glass having a thickness of 1.2 mm.

FIGS. 24(a)–24(d) provide plots of spherical aberration, astigmatism, coma, and distortion for the objective lens of Example Embodiment 4 as used with a cover glass having a thickness of 2 mm.

FIG. 27 is a schematic optical diagram of a microscope objective lens according to Example Embodiment 6.

FIG. 28 provides plots of spherical aberration exhibited by the objective lens of Example Embodiment 5 as used with a cover glass having a thickness of 1.2 mm.

FIG. 29 provides plots of spherical aberration exhibited by the objective lens of Example Embodiment 5 as used with a cover glass having zero thickness.

FIG. 30 provides plots of spherical aberration exhibited by the objective lens of Example Embodiment 5 as used with a cover glass having a thickness of 2.0 mm.

DETAILED DESCRIPTION

Figures 3, 4A, 4B, 4C:
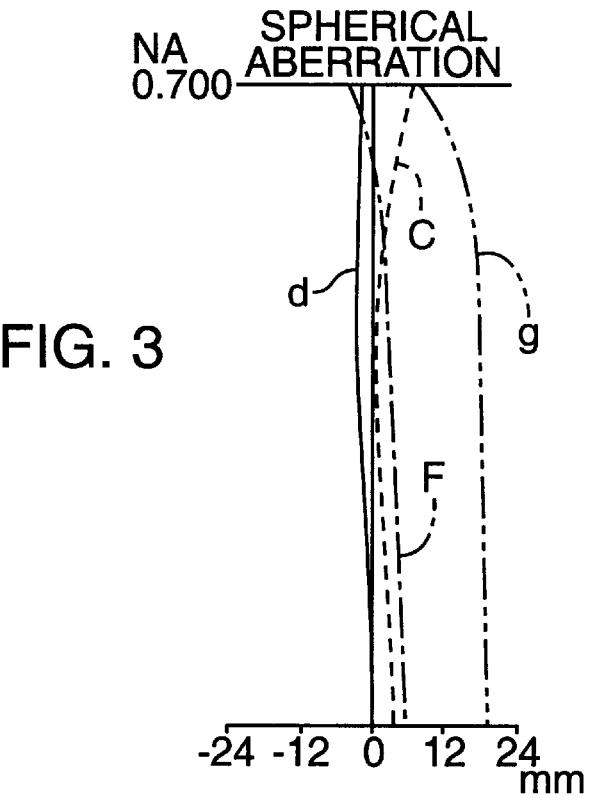
FIG. 3 depicts plots of spherical aberration of Example Embodiment 1 obtained with a transparent body (plane-parallel plate), located between the specimen and the first objective lens, having a thickness of 1.0 mm.
FIGS. 4(a)–4(c) depict plots of astigmatism, meridional coma, and distortion, respectively, of Example Embodiment 1 obtained with a transparent body (plane-parallel plate), located between the specimen and the first objective lens, having a thickness of 1.0 mm.

General Considerations for Example Embodiments 1 and 2

FIG. 1 illustrates general optical features of a microscope comprising an objective lens according to one aspect of the invention as exemplified by Example Embodiments 1 and 2. FIG. 1 shows the following features arranged on an optical axis AX: a specimen 5; an objective-lens system 3 comprising a first objective lens 1 according to the present invention, and a second objective lens 2 (imaging lens); a transparent body 6; and an ocular (eyepiece) lens 4. The objective-lens system 3 produces an image of the specimen 5 through the transparent body 6, and the image is viewed using the ocular lens 4. The first and second objective lenses 1, 2 together constitute an afocal optical system. Also, the first objective lens 1 is an "infinite" system, meaning that any axial spacing can exist between the first and second objective lenses, from zero to infinity.

As shown in the example embodiment (i.e., Example Embodiment 1) of FIG. 2, the first objective lens 1 preferably comprises, in order on an optical axis from the specimen side, a first lens group G1, a second lens group G2, and a third lens group G3.

The first lens group G1 comprises first and second positive meniscus lenses each having a concave surface facing the object (specimen) side, and first and second positive cemented lenses. The first lens group G1 is strongly convergent and functions to convert an incoming divergent bundle of rays from the specimen 5 into a convergent bundle of rays. The first lens group G1 provides some correction of spherical aberration and chromatic aberration, but the magnitude of each such correction is not large.

The second lens group G2 comprises (preferably consists of) a cemented lens having a relatively (compared to the first lens group) small positive refractive power. Large positive spherical aberrations are generated on the surface of the cemented lens of the second lens group G2. These large spherical aberrations permit correction of spherical aberrations caused by changes in the thickness of the transparent plate 6.

In an instance in which the transparent body 6 situated between the specimen 5 and the objective lens 1 is made of thick glass (n>1), spherical aberrations arise with increased thickness of the transparent body. If, in such an instance, the optical path length of the thicker portion (as converted to an equivalent air space) is corrected and the working distance determined, then the angle of incidence and the incident height of the light beam (from the optical axis) entering the first lens group G1 change at most very little. However, the spherical aberrations are insignificantly corrected by the first lens group G1.

The second lens group G2 is movable on the optical axis. Preferably, such movement is effected by a mechanism (similar to what is used in zoom lenses) manipulated using an exterior "correction ring" (i.e., a cylindrical feature on the exterior of the objective lens that can be gripped by the operator and rotated about the axis to cause axial movement of the second lens group).

The second lens group G2 is located so as to receive a convergent bundle of rays from the first lens group G1. Moving the second lens group G2 axially toward the third lens group G3 reduces the height of the rays (from the optical axis) entering the second lens group G2, and reduces positive spherical aberrations. Thus, axially moving the second lens group G2 relative to the first and third lens groups can serve to "cancel" spherical aberrations arising due to increases or decreases in the thickness of the transparent body 6.

With respect to Example Embodiments 1 and 2, the refractive power of the second lens group G2 preferably satisfies the conditional expression:

$$|f_2/f| > 50 \tag{1}$$

wherein $f_2$ is the focal length of the second lens group and f is the focal length of the objective lens. In order to generate suitable positive spherical aberration, the refractive power of the negative lens in the second lens group G2 is increased and the negative refractive power of the entire second lens group G2 is increased. However, if the refractive power of the second lens group G2 is too large, then the focal length of the entire objective lens system tends to change (e.g., increase) whenever the second lens group G2 is moved, which can degrade focus and thus reduce the utility of the objective lens. Such a problem can be controlled by satisfying conditional expression (1).

Although spherical aberrations are generated particularly in the second lens group G2 as described above, it is desirable to reduce other aberrations as much as possible. For example, chromatic aberrations are preferably controlled by using achromats especially in the first and third lens groups. The second lens group G2 contributes almost nothing to the correction of chromatic aberrations. As a beneficial result, essentially no variations occur in chromatic aberrations during movement of the second lens group G2. However, this shifts a greater burden, with respect to correcting chromatic aberration, to the first lens group G1. For example, this can necessitate an increased negative refractive power of the concave lens in the first lens group G1, which can require a slight over-correction in the first objective lens 1.

The second lens group G2 preferably comprises three lenses cemented together (e.g., in the FIG. 2 embodiment, a biconvex lens L21, a biconcave lens L22, and a biconvex lens L23). The lens L22 is made of a glass having a greater refractive index than the lens L21. Because the second lens group G2 is situated in the converging bundle of rays propagating from the first lens group G1, the height (relative to the optical axis) of light incident at the most objectwise (closest to the specimen) surface of the second lens group G2 is greatest of any surface of the second lens group. If the most objectwise surface of the second lens group G2 were to be a concave surface, the negative refractive power of the second lens group would be too strong, which would generate excessive positive spherical aberrations that could not be corrected by the other lens groups. As a result, the second (rather than the first) most objectwise surface of the second lens group G2 is preferably concave.

Because large spherical aberrations can thus be obtained without comparatively increasing the curvature of the cemented surface, it is possible to reduce any influence of the cemented surface on other aberrations. Also, because the refractive power of the cemented surface is not excessive, coma is also reduced.

An objective lens according to Example Embodiments 1 and 2 also preferably satisfies conditional expressions (3), (4) and (5):

$$V_{2n} > 50 \tag{3}$$

$$0.1 < (n_{2,2} - n_{2,1}) < 0.2 \tag{4}$$

$$0.1 < (n_{2,2} - n_{2,3}) < 0.3 \tag{5}$$

wherein $n_{2,1}$, $n_{2,2}$, and $n_{2,3}$ are refractive indices (relative to d-line light; $\lambda = 587.6$ nm) of the first positive lens, the negative lens, and the second positive lens, respectively, of the second lens group, and $V_{2n}$ is the Abbe number of the negative lens in the second lens group. Not satisfying conditional expression (3) would increase the burden on the second lens group G2 with respect to achromatism, which would increase variations in any chromatic aberrations exhibited by the first objective lens 1. Conditional expressions (4) and (5) specify the refractive-index differences of the cemented surfaces of the second lens group G2. Exceeding the upper limit of either or both of conditional expressions (4), (5) would excessively increase the radius of curvature of the cemented surfaces of the second lens group G2, making it impossible to sufficiently correct higher-order aberrations caused by changes in the thickness of the transparent body 6. Falling below the lower limit of either or both conditional expressions (4), (5) would make it impossible for the objective lens 1 to provide sufficient spherical aberrations to compensate for spherical aberrations contributed by the transparent body. This, in turn, would require that the second lens group G2 move an excessive amount on the optical axis to provide any such compensation, which would degrade correction of coma aberrations and field curvature.

The ray bundle propagating from the second lens group G2 is slightly over-corrected for both spherical aberrations and axial (longitudinal) chromatic aberrations, but chromatic aberration of magnification (lateral chromatic aberration) is insufficiently corrected by this lens group. The third lens group G3 provides good correction of lateral chromatic aberration, longitudinal chromatic aberration, as well as some correction of spherical aberration. Thus, overall, favorable optical performance of the first objective lens 1 is achieved.

As stated above, the first objective lens 1 has a strong positive refractive power; the first lens group G1 converts divergent light from a specimen into convergent light. This light propagates through the second lens group G2 to the third lens group G3 while remaining convergent. In this type of objective lens, the slope of the convergent light (relative to the optical axis) is an important factor. If the slope were to be too small, then the change in diameter of the ray bundle accompanying axial movement of the second lens group G2 would be too low, thereby excessively reducing the effect of axially moving the second lens group G2. If the slope were to be too large, then the refractive power of the first and third lens groups G1, G3 would have to be too strong for favorable correction of higher-order aberrations. A suitable slope is represented by a ratio of the maximum effective diameter $E_1$ of the first lens group G1 relative to the maximum effective diameter $E_2$ of the second lens group G2, as expressed in conditional expression (2):

$$1.1 < (E_1/E_2) < 1.3 \tag{2}$$

In order to obtain even more favorable imaging performance of an objective lens according to Example Embodiments 1 and 2, it is also preferable to satisfy conditional expressions (6) and (7):

$$2 < |(f_1/f)| < 3 \tag{6}$$

$$2 < |(r_1/f)| < 3 \tag{7}$$

wherein $f_1$ is the focal length of the first lens group and $r_1$ is the radius of curvature of a lens surface in the first lens group that is closest to the specimen side of all lenses in the first lens group. Exceeding the upper limit of conditional expression (6) would result in a working distance of the first objective lens 1 being too short. Falling below the lower limit of conditional expression (6) would cause the positive refractive power of the first lens group G1 to be too strong, making it difficult to correct higher-order chromatic and spherical aberrations. Exceeding the upper limit of conditional expression (7) would cause an increase in the Petzval's sum of the first objective lens 1, thereby degrading flatness of the image surface. Falling below the lower limit of conditional expression (7) would cause an over-correction of spherical aberration.

By satisfying some or all the conditional expressions as described above, a microscope objective lens according to the invention (as exemplified by Example Embodiments 1 and 2) can favorably correct variations in spherical aberrations caused by corresponding variations in the thickness of the transparent body situated between the specimen and the first objective lens while maintaining a suitably large working distance (i.e., axial distance from the first objective lens and the specimen.

Example Embodiments 1 and 2 of a microscope objective lens according to the invention are described below with reference to FIGS. 2–16. Each of Example Embodiments 1 and 2 comprises a first lens group G1 that converges rays from a specimen 5; a second lens group G2 having a small (preferably positive) refractive power and consisting of three lenses (positive, negative, positive) cemented together that can move along the optical axis within the convergent ray bundle; and a third lens group G3 having a negative refractive power. Aberrations imparted by a transparent body located between the specimen and the first lens group G1 are corrected by moving the second lens group G2 relative to the first and third lens groups G1, G3 in proportion to the thickness of the transparent body and the specimen.

Each of Example Embodiments 1 and 2 includes respective tables that provide lists of dimensions and other important parameters. In the tables, "f" denotes the focal length of the objective lens, "NA" denotes the numerical aperture, "β" denotes the magnification, "WD" denotes the working distance, "r" denotes the radius of curvature, "d" denotes an axial distance between adjacent lens surfaces, and "$n_d$" and "$V_d$" respectively denote the refractive index and the Abbe number (relative to d-line light ($\lambda$=587.6 nm)).

In Example Embodiments 1 and 2, the standard for the thickness of the transparent body 6 arranged between the specimen 5 and the objective lens 1 is 1 mm. The exemplary refractive index $n_d$ of the transparent body is 1.52216, and the exemplary Abbe number $V_d$ of the transparent body is 58.8.

EXAMPLE EMBODIMENT 1

Example Embodiment 1 of a first objective lens according to the invention is shown in FIG. 2. This objective lens comprises a first lens group G1, a second lens group G2, and a third lens group G3 arranged in order from the specimen side on the optical axis.

The first lens group G1 comprises two positive meniscus lenses L11 and L12, a positive cemented doublet lens consisting of a positive lens L13 and a negative meniscus lens L14, and a positive cemented triplet lens consisting of a positive lens L15, a negative lens L16, and a positive lens L17.

The second lens group G2 comprises a cemented triplet lens consisting of a positive lens L21, a negative lens L22, and a positive lens L23. The overall refractive power of the second lens group G2 is small (preferably weakly positive). The second lens group G2 is axially movable relative to the first and third lens groups.

In this embodiment, the third lens group G3 consists of a cemented triplet lens consisting of a negative lens L31, a positive lens L32, and a negative lens L33.

Aberrations are corrected by moving the second lens group G2 on the optical axis relative to the first lens group G1 and the third lens group G3. Hence, a first objective lens according to this example embodiment includes a mechanism permitting such motion. Focus adjustment is performed by changing the axial space between the objective lens and an accompanying ocular lens.

The physical dimensions of the first objective lens of this example embodiment are listed in Table 1. In this objective lens, the focal length f=3.33 mm, the numerical aperture NA=0.7, the magnification β=−60.0 and the working distance WD=2.430 mm.

TABLE 1

(Example Embodiment 1)

| Surface No. | r (mm) | d (mm) | $n_d$ | $V_d$ |
|---|---|---|---|---|
| 1 | −7.604 | 6.0 | 1.71300 | 53.93 |
| 2 | −7.107 | 0.2 | | |
| 3 | −38.885 | 2.9 | 1.49782 | 82.52 |
| 4 | −11.540 | 0.2 | | |
| 5 | 63.019 | 5.0 | 1.49782 | 82.52 |
| 6 | −10.136 | 1.3 | 1.52682 | 51.35 |
| 7 | −18.834 | 0.2 | | |
| 8 | 32.474 | 3.3 | 1.49782 | 82.52 |
| 9 | −26.068 | 1.2 | 1.60342 | 38.03 |
| 10 | 14.602 | 3.7 | 1.43388 | 95.57 |
| 11 | −38.111 | Variable ($d_{11}$) | | |
| 12 | 25.445 | 3.2 | 1.56384 | 60.69 |
| 13 | −14.212 | 1.2 | 1.71300 | 53.93 |
| 14 | 9.870 | 3.5 | 1.43388 | 95.57 |
| 15 | −30.112 | Variable ($d_{15}$) | | |
| 16 | −22.637 | 1.0 | 1.58913 | 61.09 |
| 17 | 32.962 | 1.8 | 1.67270 | 32.17 |
| 18 | −7.989 | 1.0 | 1.51860 | 69.98 |
| 19 | 10.618 | | | |

Table 2 shows the values of the working distance WD ($d_0$) and of the axial distances $d_{11}$ and $d_{15}$ whenever the thickness of the transparent body 6 (for these tests a plane-parallel plate) is 0.5 mm, 1.0 mm, and 1.5 mm. In other words, Table 2 lists values of $d_0$, and of $d_{11}$ and $d_{15}$, accompanying movement of the entire objective lens and of the second lens group G2 thereof, respectively, in response to a change in thickness of the transparent body 6. Values of the conditional expressions (1) to (7) for this example embodiment are listed in Table 3.

TABLE 2

(Example Embodiment 1)

| Plane-parallel plate thickness | $d_0$ (W.D.) | $d_{11}$ | $d_{15}$ |
|---|---|---|---|
| 0.5 mm | 2.759 mm | 0.7 mm | 22.0 mm |
| 1.0 mm | 2.430 mm | 2.7 mm | 20.0 mm |
| 1.5 mm | 2.002 mm | 5.3 mm | 17.4 mm |

TABLE 3

(Example Embodiment 1)
Values of Conditional Expressions

| | | |
|---|---|---|
| (1) | $|f_2/f| =$ | 637 |
| (2) | $E_1/E_2 =$ | 1.25 |
| (3) | $V_{2n} =$ | 53.93 |
| (4) | $n_{2,2} - n_{2,1} =$ | 0.149 |
| (5) | $n_{2,2} - n_{2,3} =$ | 0.279 |
| (6) | $|f_1/f| =$ | 2.56 |
| (7) | $|r_1/f| =$ | 2.28 |

FIGS. 3, 4(a)–4(c), 5, 6(a)–6(c), 7, and 8(a)–8(c) show aberration curves of the objective lens of this example embodiment having dimensions as listed in Tables 1 and 2. More specifically, FIGS. 3 and 4(a)–4(c) show aberrations when the thickness of the transparent body 6 is 1.0 mm (this thickness is the "standard value" of the thickness of the transparent body). FIGS. 5 and 6(a)–6(c) show aberrations when the thickness of the transparent body 6 is 0.5 mm (i.e., 0.5 mm thinner than the standard value). FIGS. 7 and 8(a)–8(c) show aberrations when the thickness of the transparent body is 1.5 mm (i.e., 0.5 mm thicker than the standard value).

Figure 5:
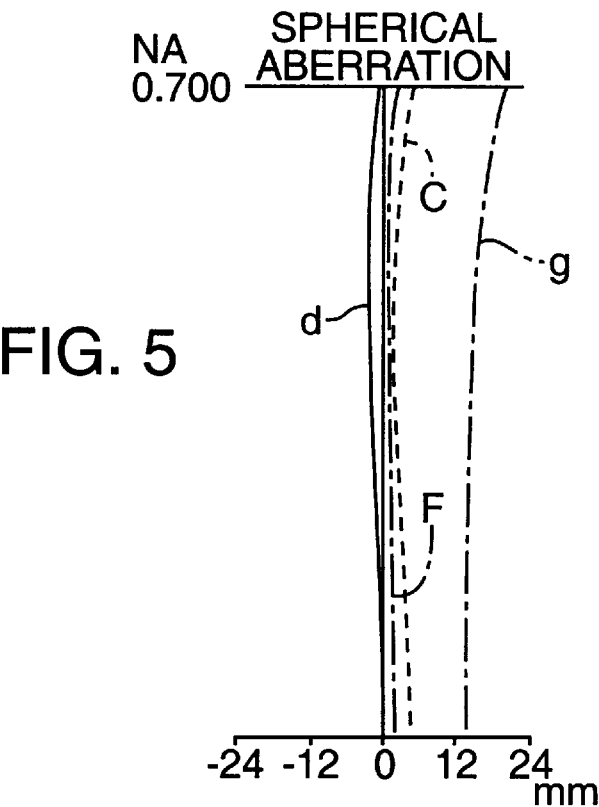
FIG. 5 depicts plots of spherical aberration of Example Embodiment 1 obtained with a transparent body (plane-parallel plate), located between the specimen and the first objective lens, having a thickness of 0.5 mm.
Figure 7:
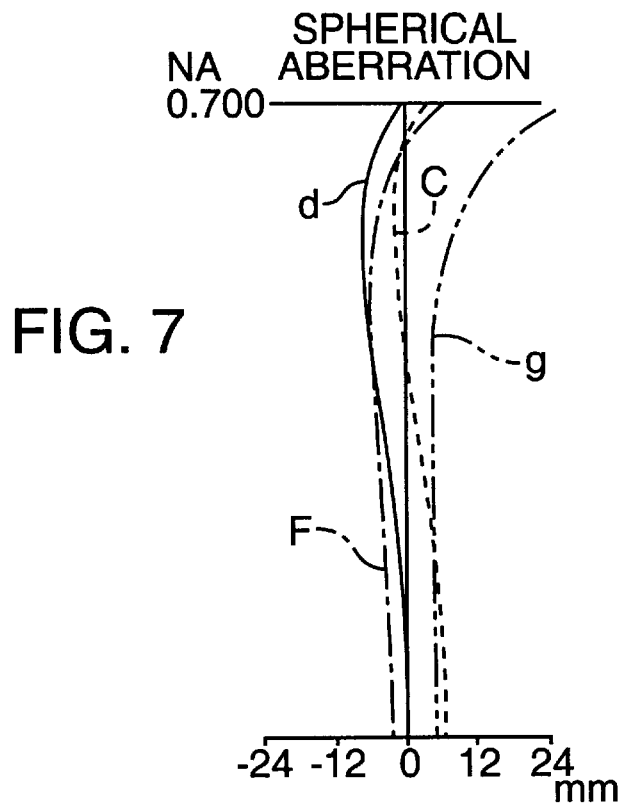
FIG. 7 depicts plots of spherical aberration of Example Embodiment 1 obtained with a transparent body (plane-parallel plate), located between the specimen and the first objective lens, having a thickness of 1.5 mm.

FIGS. 3, 5, and 7 depict spherical aberrations. In each of these figures, the solid-line plot (labeled "d") was obtained using d-line light (587.6 nm); the plot labeled "C" was obtained using C-line light (656.3 nm); the plot labeled "F" was obtained using F-line light (486.1 nm); and the plot labeled "g" was obtained using g-line light (435.8 nm).

Figure 6A:
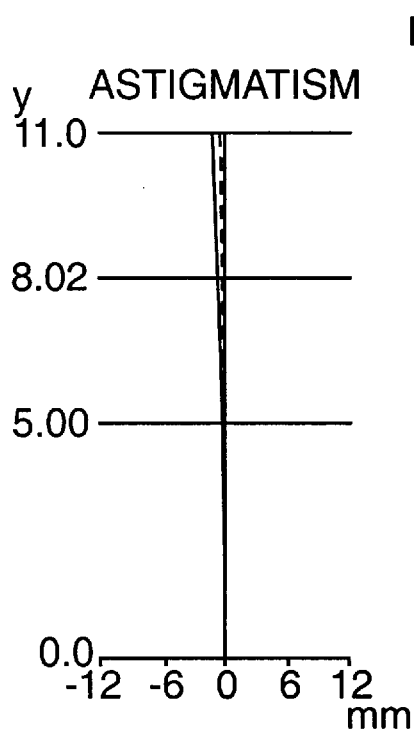
FIGS. 6(a)–6(c) depict plots of astigmatism, meridional coma, and distortion, respectively, of Example Embodiment 1 obtained with a transparent body (plane-parallel plate), located between the specimen and the first objective lens, having a thickness of 0.5 mm.
Figure 6B:
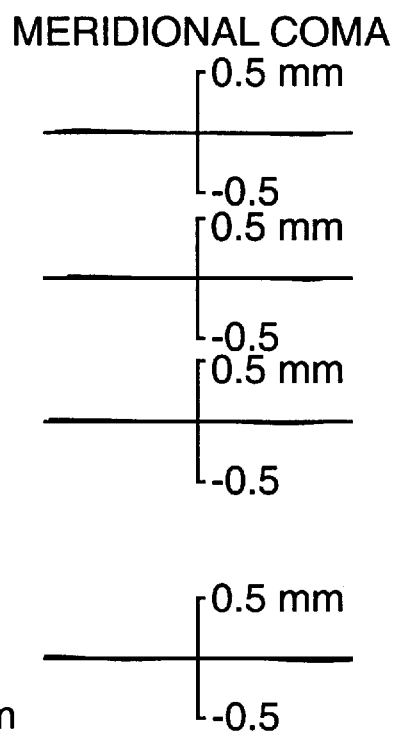
Figure 6C:
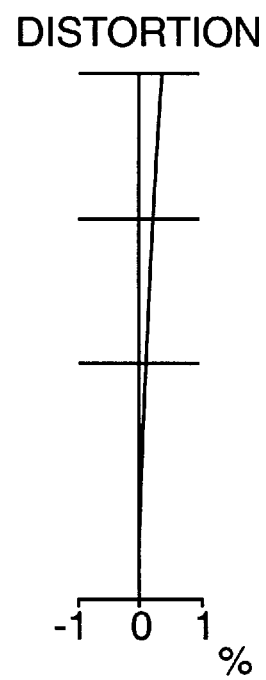
Figures 8A, 8B, 8C:
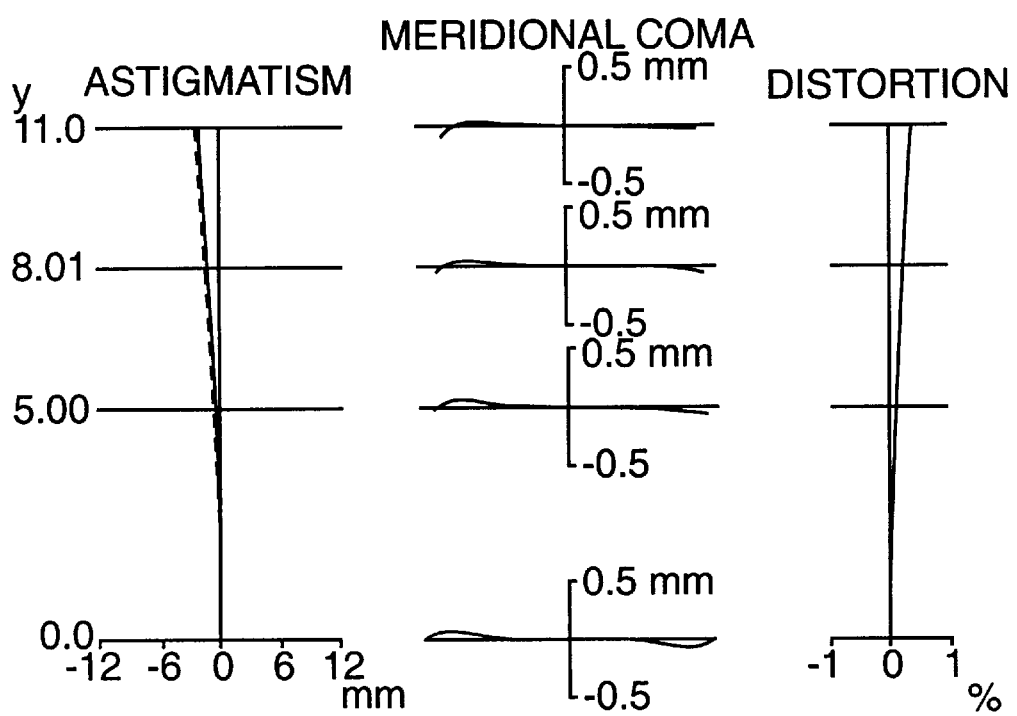
FIGS. 8(a)–8(c) depict plots of astigmatism, meridional coma, and distortion, respectively, of Example Embodiment 1 obtained with a transparent body (plane-parallel plate), located between the specimen and the first objective lens, having a thickness of 1.5 mm.

FIGS. 4(a), 6(a), and 8(a) are of astigmatism; FIGS. 4(b), 6(b), and 8(b) are of meridional coma; and FIGS. 4(c), 6(c), and 8(c) are of distortion. In FIGS. 4(a), 6(a), and 8(a), the solid line denotes the sagittal image surface, the broken line denotes the meridional image surface, and "y" denotes the image height.

EXAMPLE EMBODIMENT 2

Figure 9:
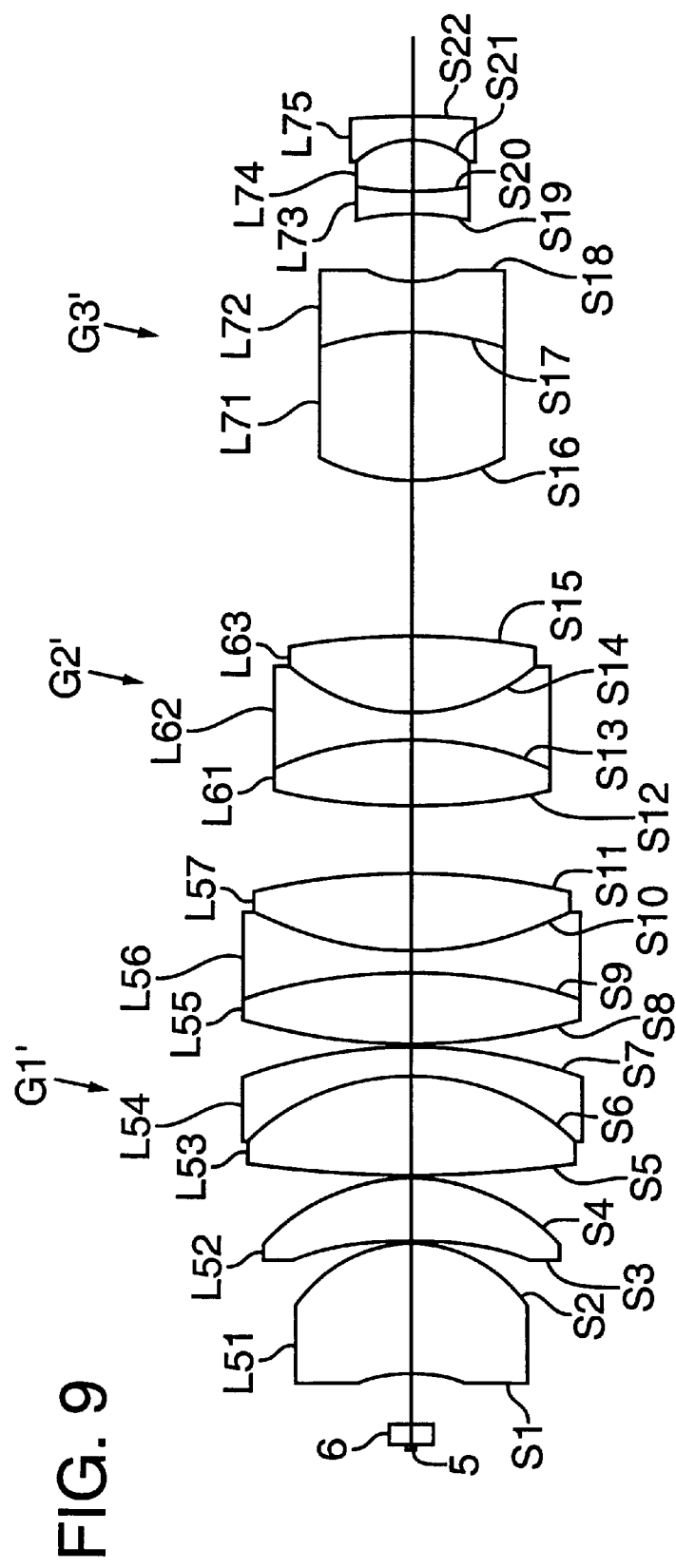
FIG. 9 is a schematic optical diagram of Example Embodiment 2 of a first objective lens according to the invention.

This example embodiment is shown in FIG. 9. The objective lens of this example embodiment comprises a first lens group G1', a second lens group G2', and a third lens group G3' arranged in order from the specimen side on the optical axis.

The first lens group G1' comprises two positive meniscus lenses L51 and L52, a positive cemented doublet consisting of a positive lens L53 and a negative lens L54, and a cemented triplet lens consisting of a positive lens L55, a negative lens L56, and a positive lens L57.

The second lens group G2' consists of a cemented triplet lens consisting of a positive lens L61, a negative lens L62, and a positive lens L63. The overall refractive power of the second lens group G2' is small (preferably weakly positive).

The third lens group G3' comprises a cemented doublet lens consisting of a positive lens L71 and a negative lens L72, and a cemented triplet lens consisting of a negative lens L73, a positive lens L74, and a negative lens L75.

Aberrations are corrected by moving the second lens group G2' on the optical axis relative to the first lens group G1' and the third lens group G3'. Hence, the first objective lens according to this example embodiment includes a mechanism permitting such motion.

The physical dimensions of the first objective lens of this example embodiment are listed in Table 4. In this objective lens, the focal length f=3.33 mm, the numerical aperture NA=0.7, the magnification β=−60.0 and the working distance WD=2.460 mm.

TABLE 4

(Example Embodiment 2)

| Surface No. | r (mm) | d (mm) | $n_d$ | $V_d$ |
|---|---|---|---|---|
| 1 | −8.624 | 6.07 | 1.71300 | 53.93 |
| 2 | −7.414 | 0.2 | | |
| 3 | −23.165 | 2.95 | 1.49782 | 82.52 |
| 4 | −10.199 | 0.2 | | |
| 5 | 57.931 | 4.8 | 1.49782 | 82.52 |
| 6 | −11.594 | 1.3 | 1.54814 | 45.87 |
| 7 | −25.366 | 0.2 | | |
| 8 | 28.808 | 3.4 | 1.49782 | 82.52 |
| 9 | −27.666 | 1.1 | 1.57501 | 41.42 |
| 10 | 16.530 | 3.8 | 1.43385 | 95.25 |
| 11 | −30.244 | Variable ($d_{11}$) | | |
| 12 | 31.220 | 3.2 | 1.56384 | 60.69 |
| 13 | −16.261 | 1.2 | 1.69680 | 55.60 |
| 14 | 9.292 | 3.5 | 1.49782 | 82.52 |
| 15 | −50.069 | Variable ($d_{15}$) | | |

TABLE 4-continued (Example Embodiment 2)

| Surface No. | r (mm) | d (mm) | $n_d$ | $V_d$ |
|---|---|---|---|---|
| 16 | 9.733 | 7.0 | 1.43385 | 95.25 |
| 17 | −13.774 | 2.35 | 1.60342 | 38.03 |
| 18 | 4.971 | 3.25 | | |
| 19 | −9.343 | 1.0 | 1.51860 | 69.38 |
| 20 | 15.134 | 2.45 | 1.62004 | 36.27 |
| 21 | −4.202 | 1.1 | 1.51860 | 69.98 |
| 22 | −46.781 | | | |

Table 5 shows the values of the working distance WD ($d_0$) and of the axial distances $d_{11}$ and $d_{15}$ whenever the thickness of the transparent body 6 (for these tests a plane-parallel plate) 0.5 mm, 1.0 mm, and 1.5 mm. In other words, Table 4 lists values of $d_0$, and of $d_{11}$ and $d_{15}$, accompanying movement of the second lens group G2' thereof, respectively, in response to a change in thickness of the transparent body 6. Values of the conditional expressions (1) to (7) for this example embodiment are listed in Table 6.

TABLE 5

(Example Embodiment 2)

| Plane-parallel plate thickness | $d_0$ (W.D.) | $d_{11}$ | $d_{15}$ |
|---|---|---|---|
| 0.5 mm | 2.789 mm | 1.07 mm | 9.58 mm |
| 1.0 mm | 2.460 mm | 3.20 mm | 7.45 mm |
| 1.5 mm | 2.032 mm | 6.02 mm | 4.63 mm |

TABLE 6

(Example Embodiment 2)
Values of Conditional Expressions

| | | |
|---|---|---|
| (1) | $|f_2/f| =$ | 555 |
| (2) | $E_1/E_2 =$ | 1.21 |
| (3) | $V_{2n} =$ | 55.60 |
| (4) | $n_{2,2} - n_{2,1} =$ | 0.133 |
| (5) | $n_{2,2} - n_{2,3} =$ | 0.199 |
| (6) | $|f_1/f| =$ | 2.64 |
| (7) | $|r_1/f| =$ | 2.59 |

FIGS. 10, 11(a)–11(c), 12, 13(a)–13(c), 14, and 15(a)–15(c) show aberration curves of the objective lens of this example embodiment having dimensions as listed in Tables 4 and 5. More specifically, FIGS. 10 and 11(a)–11(c) show aberrations when the thickness of the transparent body 6 is 1.0 mm. FIGS. 12 and 13(a)–13(c) show aberrations when the thickness of the transparent body is 0.5 mm (i.e., 0.5 mm thinner than the standard value). FIGS. 14 and 15(a)–15(c) show aberrations when the thickness of the transparent body 6 is 1.5 mm (i.e., 0.5 mm thicker than the standard value).

Figure 10:
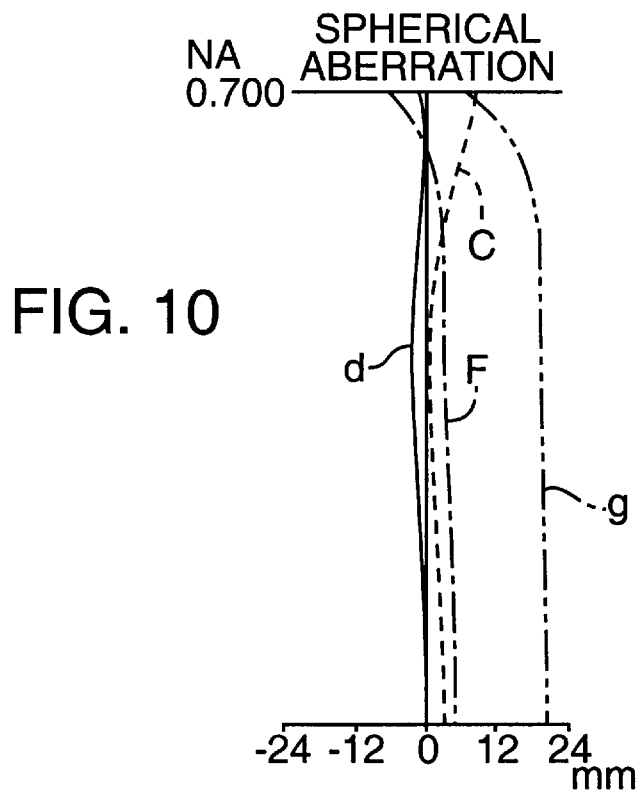
FIG. 10 depicts plots of spherical aberration of Example Embodiment 2 obtained with a transparent body (plane-parallel plate), located between the specimen and the first objective lens, having a thickness of 1.0 mm.
Figure 12:
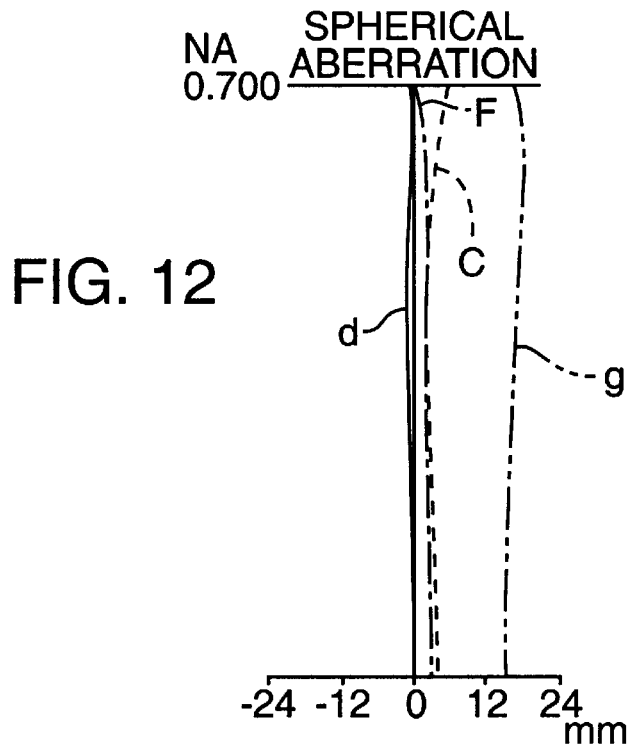
FIG. 12 depicts plots of spherical aberration of Example Embodiment 2 obtained with a transparent body (plane-parallel plate), located between the specimen and the first objective lens, having a thickness of 0.5 mm.
Figure 14:
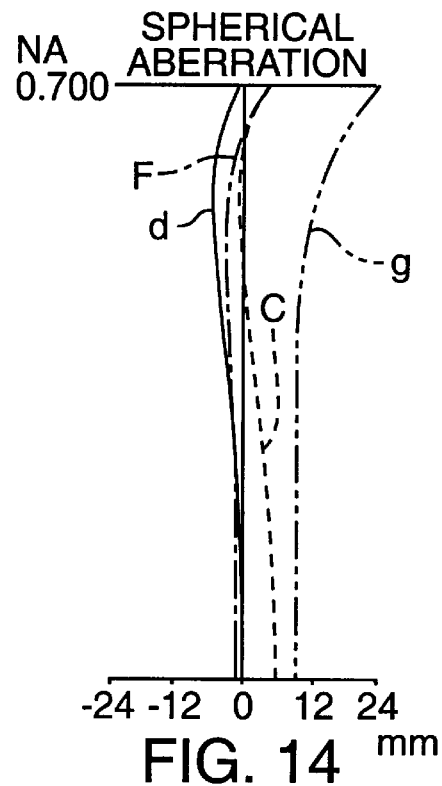
FIG. 14 depicts plots of spherical aberration of Example Embodiment 2 obtained with a transparent body (plane-parallel plate), located between the specimen and the first objective lens, having a thickness of 1.5 mm.

FIGS. 10, 12, and 14 depict spherical aberrations. In these figures, solid-line plot (labeled "d") was obtained using d-line light (587.6 nm), the plot labeled "C" was obtained using C-line light (λ=656.3 nm), the plot labeled "F" was obtained using F-line light (λ=486.1 nm), and the plot labeled "g" was obtained using g-line light (λ=435.8 nm).

Figures 11A, 11B, 11C:
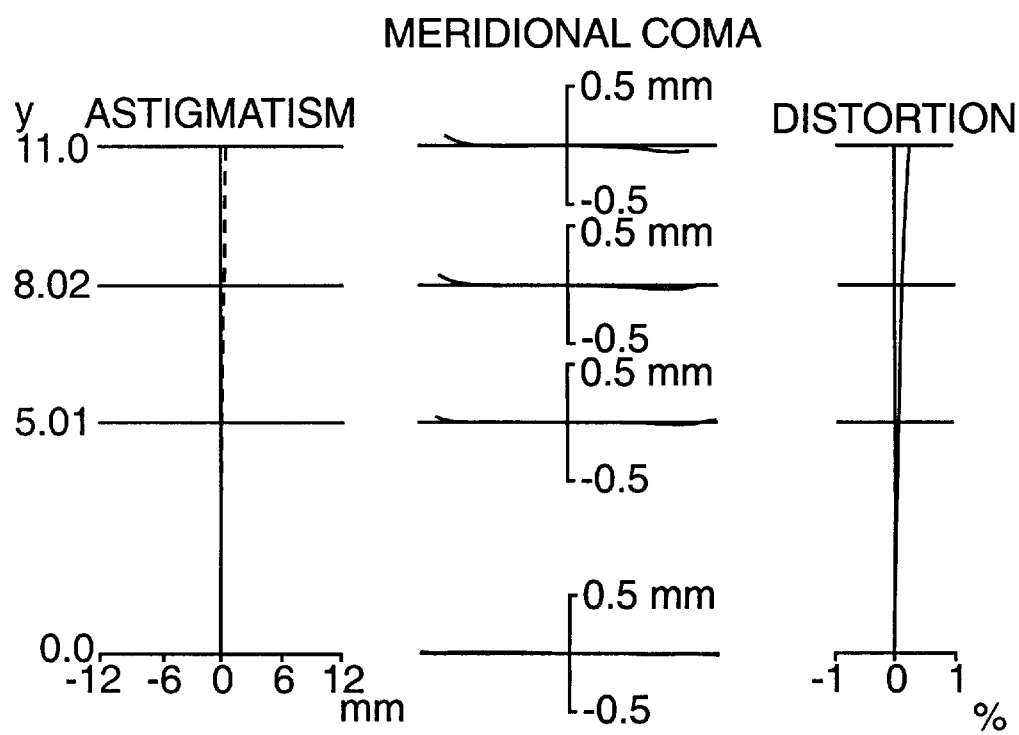
FIGS. 11(a)–11(c) depict plots of astigmatism, meridional coma, and distortion, respectively, of Example Embodiment 2 obtained with a transparent body (plane-parallel plate), located between the specimen and the first objective lens, having a thickness of 1.0 mm.
Figures 13A, 13B, 13C:
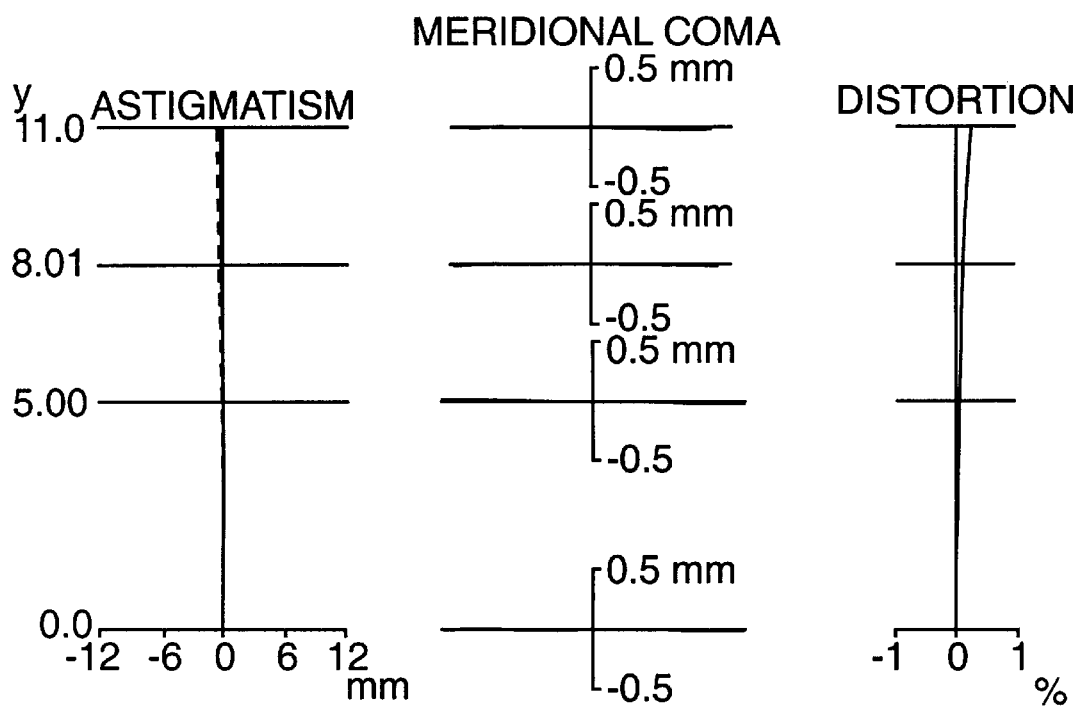
FIGS. 13(a)–13(c) depict plots of astigmatism, meridional coma, and distortion, respectively, of Example Embodiment 2 obtained with a transparent body (plane-parallel plate), located between the specimen and the first objective lens, having a thickness of 0.5 mm.
Figure 15A:
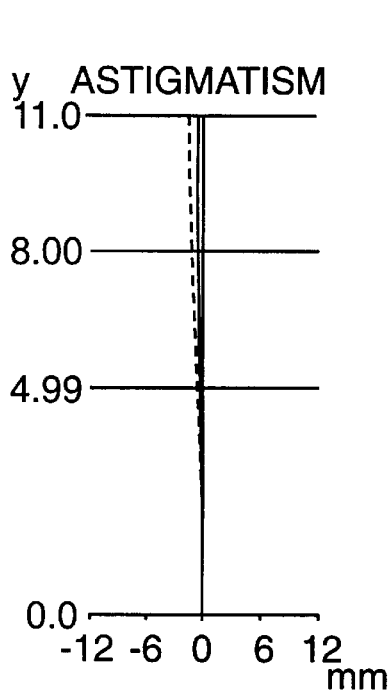
FIGS. 15(a)–15(c) depict plots of astigmatism, meridional coma, and distortion, respectively, of Example Embodiment 2 obtained with a transparent body (plane-parallel plate), located between the specimen and the first objective lens, having a thickness of 1.5 mm.
Figure 15B:
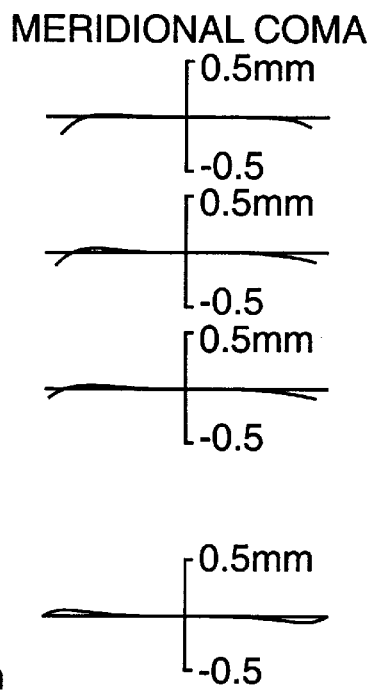
Figure 15C:
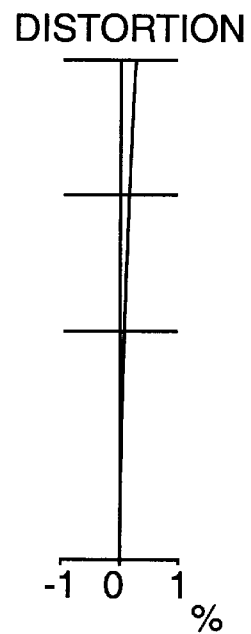

FIGS. 11(a), 13(a), and 15(a) are of astigmatism; FIGS. 11(b), 13(b), and 15(b) are of meridional coma; and FIGS. 11(c), 13(c), and 15(c) are of distortion. In FIGS. 11(a), 13(a), and 15(a), the solid line denotes the sagittal image surface, the broken line denotes the meridional image surface, and "y" denotes the image height.

The first objective lens as exemplified by each of Example Embodiments 1 and 2 is an infinitely corrected optical system in which, alone, an image is not formed. I.e., as indicated in FIG. 1, an image of the specimen is obtained by combining the subject first objective lens 1 with a second objective lens 2 (i.e., an "imaging lens") and using the resulting combination a microscope objective lens. Hence, all the aberration curves described above were obtained by a combination of the subject first objective lens with a second objective lens 2.

Figure 16:
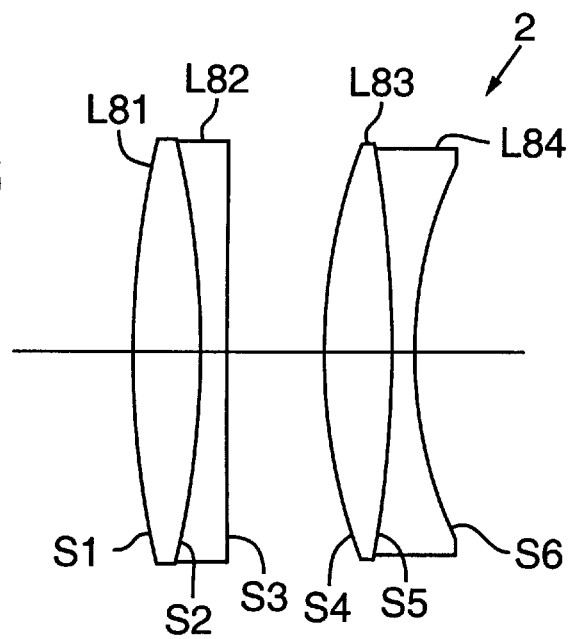
FIG. 16 is a schematic optical diagram of an imaging lens used in combination with the first objective lens of the present invention.

A representative second objective lens (imaging lens) 2 is shown in FIG. 16. The imaging lens 2 comprises a first cemented lens consisting of a positive lens L81 and a negative lens L82, and a second cemented lens consisting of a positive lens L83 and a negative lens L84. The physical dimensions of these lenses are listed in Table 7.

TABLE 7

| Surface No. | r (mm) | d (mm) | $n_d$ | $V_d$ |
|---|---|---|---|---|
| 1 | 75.043 | 5.1 | 1.62280 | 57.03 |
| 2 | −75.043 | 2.0 | 1.74950 | 35.19 |
| 3 | 1600.580 | 7.5 | | |
| 4 | 50.256 | 5.1 | 1.66755 | 41.96 |
| 5 | −84.541 | 1.8 | 1.61266 | 44.40 |
| 6 | 36.911 | | | |

Hence Example Embodiments 1 and 2 are exemplary of first objective lenses according to the present invention that provide stable imaging performance that is provided even during changes in the thickness of an optically transparent body (e.g., cover glass or other plane-parallel plate) situated between the observed surface of a specimen and the objective lens. Such imaging performance is preserved even with such first objective lenses having a relatively high magnification (e.g., 60×). Furthermore, because of its long working distance and small focal length, submerged specimens and thick specimens can be reliably observed by manipulating the "correction ring" that moves the second lens group.

GENERAL CONSIDERATIONS FOR EXAMPLE EMBODIMENTS 3–6

According to another aspect of the invention, microscope objective lenses as exemplified by Example Embodiments 3–6 comprise, in order from the specimen side and arrayed on an optical axis, a first lens group G1, a second lens group G2, a third lens group G3, and a fourth lens group G4. The first, second, and third lens groups G1, G2, G3, respectively, are all positive. The fourth lens group G4 is negative. The second lens group G2 is movable on the optical axis relative to the first, third, and fourth lens groups.

The first lens group preferably comprises a single positive lens (most preferably a positive meniscus lens) that can be either a single lens element or two lens elements cemented together. The second lens group preferably comprises a single positive lens consisting of, from the specimen side, a negative lens cemented to a positive lens. The third lens group G3 comprises multiple positive lenses preferably including at least one cemented lens. The fourth lens group G4 preferably comprises a single lens that most preferably consists of, from the specimen side, a positive lens cemented to a negative lens. By way of example, these features can be seen in FIG. 17.

The positive meniscus lens of the first lens group G1 has a convex surface facing the image side (i.e., facing to the right in the figures herein). The first lens group G1 causes a divergent bundle of rays from the specimen to become less divergent. In addition, the first lens group G1 provides some control over the generation of aberrations.

The ray bundle exiting the first lens group enters the second lens group G2 which causes the ray bundle passing through the second lens group G2 to become even less divergent. The cemented surface of the second lens group G2 is especially effective in correcting spherical aberrations.

The third lens group G3 causes the ray bundle passing through it to become convergent. By having the third lens group comprise at least one cemented positive lens and at least one other positive lens (which can also be a cemented positive lens), various aberrations are corrected using only a few lenses.

The cemented negative lens in the fourth lens group G4 is especially effective in correcting chromatic aberrations of magnification.

Thus, each of the second, third, and fourth lens groups includes a negative lens (incorporated into a cemented lens in each lens group). Such a configuration is effective in providing a negative Petzval's sum. Such a configuration, in turn, results in a microscope objective lens that provides extremely good flatness of the image surface.

As mentioned above, the second lens group G2 is axially movable. Such movement allows the height (relative to the optical axis) of the ray bundle entering the second lens group G2 to be adjusted for correction of spherical aberrations. Because only the second lens group is movable, spherical aberrations can be corrected over a large range without influencing the correction of other aberrations by the other lens groups.

EXAMPLE EMBODIMENTS 3 AND 4

In microscope objective lenses as exemplified by Example Embodiments 3 and 4, the first lens group G1 consists of a single positive meniscus lens having a convex surface facing toward the image side. The second lens group G2 consists of a positive cemented lens consisting of, from the specimen side, a negative lens cemented to a positive lens; the third lens group consists of a single positive lens and a positive cemented lens consisting of a negative lens cemented to a positive lens; and the fourth lens group consists of a cemented lens consisting of, from the specimen side, a positive lens cemented to a negative lens. The second lens group G2 is axially movable along the optical axis for the purpose of correcting variable spherical aberrations arising from use of a transparent body (e.g., cover glass, specimen dish) between the specimen and the objective lens.

Objective lenses as exemplified by Example Embodiments 3 and 4 preferably satisfy conditional expression (8):

$$9 < f_2/f < 24 \qquad (8)$$

wherein f is the focal length of the objective lens and $f_2$ is the focal length of the second lens group. Conditional expression (8) stipulates an especially advantageous range of the refractive power of the second lens group G2. Falling below the lower limit of conditional expression (8) would cause a generation of an excessive spherical aberration, making use of a thick transparent body between the specimen and the objective lens difficult. Exceeding the upper limit of conditional expression (8) would render the spherical aberrations generated by the objective lens insufficient to provide adequate compensation for the spherical aberration imparted by the transparent body. This would make it exceedingly difficult to use a thin transparent body (such as a thin cover glass) with the objective lens.

Objective lenses as exemplified by Example Embodiments 3 and 4 also preferably satisfy conditional expressions (9)–(13):

$$|r_{1,1}|/f<4 \tag{9}$$

$$-1.1<r_{1,2}/f<-0.8 \tag{10}$$

$$0.01<d_{1,2}/f<0.3 \tag{11}$$

$$n_{2,1}-n_{2,2}>0.13 \tag{12}$$

$$n_{3,2}-n_{3,1}>0.2 \tag{13}$$

wherein $r_{1,1}$ is the radius of curvature of the lens in the first lens group G1 that is closest to the object (specimen) side; $r_{1,2}$ is the radius of curvature of the lens in the first lens group G1 that is closest to the image side; $d_{1,2}$ is the axial distance between the first lens group G1 and the second lens group G2; $n_{2,1}$ is the refractive index of the negative lens in the second lens group G2; $n_{2,2}$ is the refractive index of the positive lens of the second lens group G2; $n_{3,1}$ is the refractive index of the positive lens in the cemented lens in the third lens group G3; and $n_{3,2}$ is the refractive index of the negative lens in the cemented lens in the third lens group.

Conditional expression (9) is largely related to the flatness of the image surface of the subject objective lens. In the first lens group G1, the lens surface that is closest to the object (specimen) side has a pronounced refractive function. In view thereof, the Petzval's sum of the objective lens can be greatly corrected by optimizing the curvature radius of this surface, thereby resulting in good flatness of the image surface of the objective lens.

Satisfying conditional expression (9) also tends to result in over-correction of axial chromatic aberrations; furthermore, spherical aberrations in the first lens group G1 and in the second lens group G2 tend to be favorably corrected. Exceeding the upper limit of conditional expression (9) would cause the amount of aberration correction in the first lens group G1 to be to large which would make it impossible to favorably correct spherical aberrations in the second lens group G2.

Satisfying conditional expression (10) tends to over-correct axial chromatic aberrations. Also, spherical aberrations in the first and second lens groups are within an especially favorable range for correction. Falling below the lower limit of conditional expression (10) would cause aberration correction in the first lens group G1 to be too large, thereby making it impossible to favorably correct spherical aberrations in the second lens group G2. Exceeding the upper limit of conditional expression (3) would lessen the refractivity of the lens surface, within the first lens group G1, that is closest to the image side, making it impossible to favorably correct spherical aberrations in the second lens group G2.

Satisfying conditional expression (11) provides an effective range of axial movement between the first lens group G1 and the second lens group G2. Falling below the lower limit of conditional expression (11) would cause rays entering the second lens group G2 to be too close to the optical axis, allowing spherical aberrations only from a thick transparent body to be adequately corrected. Exceeding the upper limit of conditional expression (11) would cause rays entering the second lens group G2 to propagate too far in a direction away from the optical axis, allowing spherical aberrations only from a thin transparent body to be adequately corrected.

Conditional expressions (12) and (13) provide adequate ranges for correcting higher-order chromatic aberrations. Falling below the lower limit of either conditional expression would render it prohibitively difficult to adequately correct chromatic aberrations.

Figure 17:
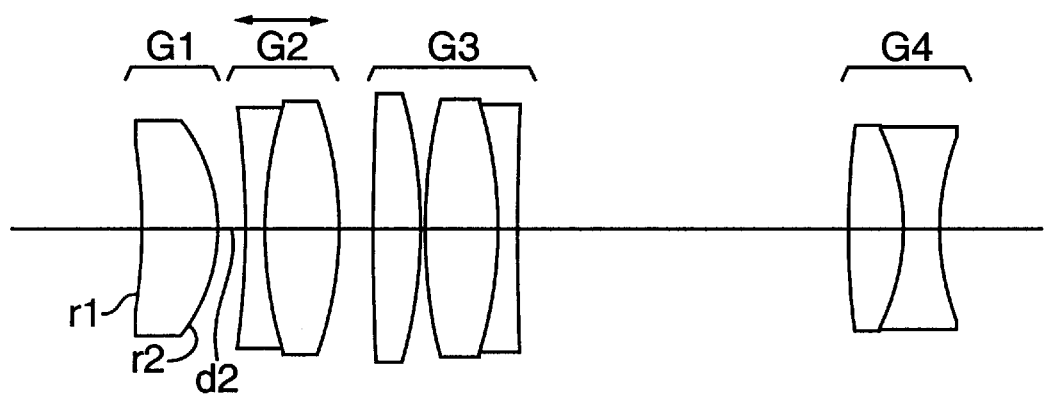
FIG. 17 is a schematic optical diagram of a microscope objective lens according to Example Embodiment 3.
Figure 18:
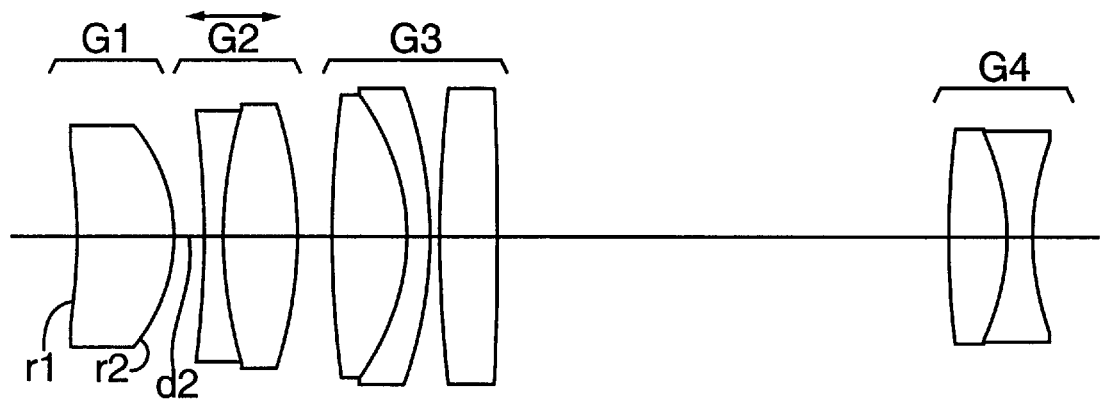
FIG. 18 is a schematic optical diagram of a microscope objective lens according to Example Embodiment 4.

FIGS. 17 and 18 depict lens compositions of example embodiments 3 and 4, respectively. Physical dimensions of these example embodiments are listed in Table 8 and Table 11, respectively, below. In Tables 8 and 11, "f" is the focal length of the objective lens, "NA" is the numerical aperture of the objective lens, "β" is the magnification, and "WD" is the working distance (i.e., axial distance between the specimen and the distal terminus of the objective lens closest to the specimen). The left-hand column of numbers refer to surface numbers, in order from the object (specimen) side. Curvature radii are denoted "r", axial distances between adjacent surfaces are denoted "d", refractive indices (relative to d-line light; $\lambda=587.6$ nm) are denoted "$n_D$", and "VD" denotes the Abbe number.

Tables 9 and 12 show, for Example Embodiments 3 and 4, respectively, representative values of the axial distances on both side of the second lens group resulting from use of a transparent body ("cover glass") having different thicknesses.

Tables 10 and 13 show, for Example Embodiments 3 and 4, respectively, values of conditional expressions (8)–(13).

Objective lenses of both Example Embodiments 3 and 4 are preferably made using glass materials that are substantially transparent to ultraviolet light to enable them to be used for fluorescent microscopy.

TABLE 8

(Example Embodiment 3)

Overall Specifications f = 10 mm          N.A. = 0.45
β = −20.0          W.D. = 8.7~7.6 mm = $d_0$ Lens Specifications

| Surface No. | r (mm) | d (mm) | $n_D$ | $V_D$ | Lens Group |
|---|---|---|---|---|---|
| 1 | −36.02 | 3.95 | 60.6 | 1.5638 | G1 |
| 2 | −9.05 | Variable | | | G1 |
| 3 | −99.51 | 1.0 | 41.4 | 1.5750 | G2 |
| 4 | 16.93 | 3.9 | 95.5 | 1.4338 | G2 |
| 5 | −20.50 | Variable | | | G2 |
| 6 | 79.17 | 2.5 | 82.5 | 1.4978 | G3 |
| 7 | −20.50 | 0.2 | | | G3 |
| 8 | 22.50 | 3.8 | 95.5 | 1.4338 | G3 |
| 9 | −22.50 | 1.0 | 32.1 | 1.6727 | G3 |
| 10 | 128.91 | 16.9 | | | G3 |
| 11 | 30.50 | 2.8 | 36.2 | 1.6200 | G4 |
| 12 | 12.44 | 1.8 | 51.3 | 1.5268 | G4 |
| 13 | 11.59 | | | | G4 |

TABLE 9

(Example Embodiment 3)

| Cover-glass thickness | $d_0$ | $d_2$ | $d_5$ |
|---|---|---|---|
| 0 mm | 8.7 mm | 2.5 mm | 0.5 mm |
| 1.2 mm | 8 mm | 1.3 mm | 1.7 mm |
| 2 mm | 7.6 mm | 0.5 mm | 2.5 mm |

TABLE 10

(Example Embodiment 3)

| | | |
|---|---|---|
| (8) | $f_2/f =$ | 11.6 |
| (9) | $|r_{1,1}|/f =$ | 3.602 |
| (10) | $r_{1,2}/f =$ | −0.905 |
| (11) | $d_{1,2}/f =$ | 0.04 (2 mm cover glass) |
| | | 0.12 (1.2 mm cover glass) |
| | | 0.22 (0 mm cover glass) |
| (12) | $n_{2,1} - n_{2,2} =$ | 0.14 |
| (13) | $n_{3,2} - n_{3,1} =$ | 0.23 |

TABLE 11

(Example Embodiment 4)

Overall Specifications f = 10 mm   N.A. = 0.45
β = −20.0   W.D. = 8.5~7.3 mm = $d_0$ Lens Specifications

| Surface No. | r (mm) | d (mm) | $n_D$ | $V_D$ | Lens Group |
|---|---|---|---|---|---|
| 1 | −37.00 | 5.0 | 60.6 | 1.5638 | G1 |
| 2 | −8.90 | Variable | | | G1 |
| 3 | −114.00 | 1.0 | 38.3 | 1.6204 | G2 |
| 4 | 19.84 | 3.8 | 95.5 | 1.4338 | G2 |
| 5 | −23.57 | Variable | | | G2 |
| 6 | 44.32 | 3.8 | 95.5 | 1.4338 | G3 |
| 7 | −12.29 | 1.2 | 32.1 | 1.6727 | G3 |
| 8 | −23.63 | 0.5 | | | G3 |
| 9 | 47.91 | 3.0 | 82.5 | 1.4978 | G3 |
| 10 | −516.53 | 23.0 | | | G3 |
| 11 | 42.79 | 3.0 | 36.2 | 1.6200 | G4 |
| 12 | −11.82 | 1.3 | 51.3 | 1.5268 | G4 |
| 13 | 12.31 | | | | G4 |

TABLE 12

(Example Embodiment 4)

| Cover-glass thickness | $d_0$ | $d_2$ | $d_5$ |
|---|---|---|---|
| 0 mm | 8.5 mm | 2.9 mm | 0.5 mm |
| 1.2 mm | 7.7 mm | 1.5 mm | 1.9 mm |
| 2 mm | 7.3 mm | 0.6 mm | 2.8 mm |

TABLE 13

(Example Embodiment 4)

| | | |
|---|---|---|
| (8) | $f_2/f =$ | 23.1 |
| (9) | $|r_{1,1}|/f =$ | 0.37 |
| (10) | $r_{1,2}/f =$ | 0.89 |
| (11) | $d_{1,2}/f =$ | 0.06 (2 mm cover glass) |
| | | 0.15 (1.2 mm cover glass) |
| | | 0.29 (0 mm cover glass) |
| (12) | $n_{2,1} - n_{2,2} =$ | 0.186 |
| (13) | $n_{3,2} - n_{3,1} =$ | 0.238 |

With respect to Example Embodiment 3, FIG. 19 provides a full set of aberration curves for the objective lens as used with a cover glass having zero thickness; FIG. 20 provides a full set of aberration curves for the objective lens as used with a cover glass having a thickness of 1.2 mm; and FIG. 21 provides a full set of aberration curves for the objective lens as used with a cover glass having a thickness of 2 mm.

Figures 22A, 22B, 22C, 22D:
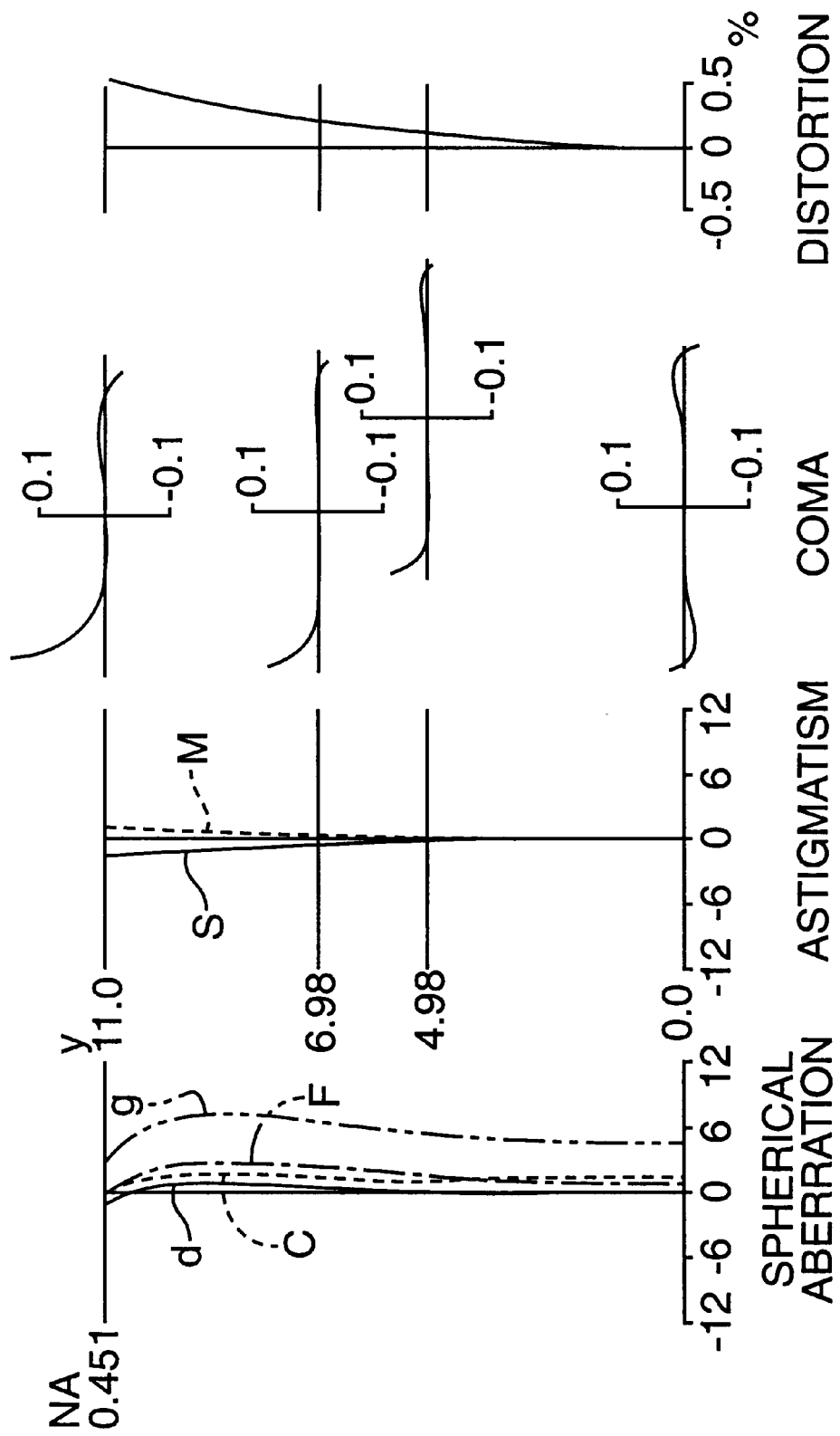
FIGS. 22(a)–22(d) provide plots of spherical aberration, astigmatism, coma, and distortion for the objective lens of Example Embodiment 4 as used with a cover glass having zero thickness.

With respect to Example Embodiment 4, FIG. 22 provides a full set of aberration curves for the objective lens as used with a cover glass having zero thickness; FIG. 23 provides a full set of aberration curves for the objective lens as used with a cover glass having a thickness of 1.2 mm; and FIG. 24 provides a full set of aberration curves for the objective lens as used with a cover glass having a thickness of 2 mm.

With respect to the curves for spherical aberration, the solid line denotes the curve for d-line light (λ=587.6 nm); the curve labeled "C" denotes the curve for c-line light (λ=656.28 nm); the curve labeled "F" denotes the curve for f-line light (λ=486.13 nm); and the curve labeled "g" denotes the curve for g-line light (λ=435.84 nm). With respect to the curves for astigmatism, the broken line denotes the meridional image surface and the solid line denotes the sagittal image surface.

Figure 25:
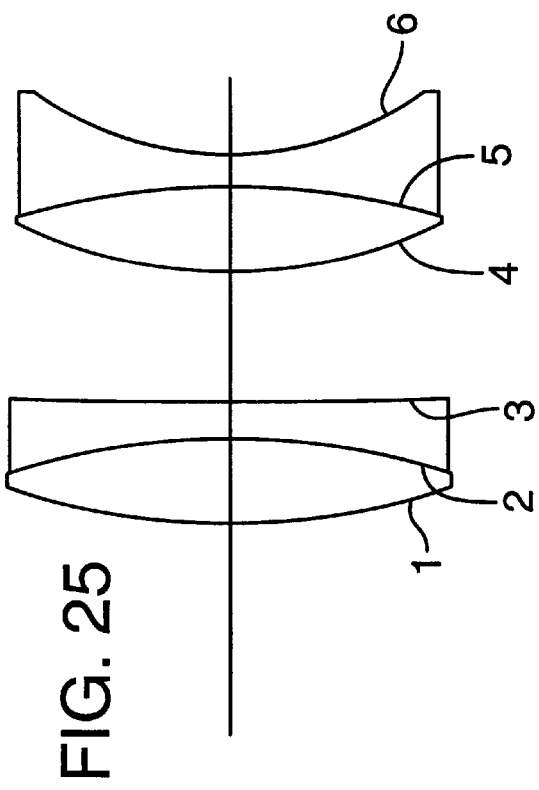
FIG. 25 is a schematic optical diagram of an imaging lens used with Example Embodiments 3–6 to produce the aberration data disclosed herein.

In order to produce the data in FIGS. 19–24, the objective lenses of Example Embodiments 3 and 4 were used in combination with an imaging lens as shown in FIG. 25 and described in Table 14.

TABLE 14

| Surface No. | r (mm) | d (mm) | $n_d$ | $V_d$ |
|---|---|---|---|---|
| 1 | 75.0430 | 5.10 | 1.6228 | 57.03 |
| 2 | −75.0430 | 2.00 | 1.7495 | 35.19 |
| 3 | 1600.5800 | 7.50 | | |
| 4 | 50.2560 | 5.10 | 1.6675 | 41.96 |
| 5 | −84.5410 | 1.80 | 1.6126 | 44.41 |
| 6 | 36.9110 | | | |

Thus, Example Embodiments 3 and 4 are exemplary of microscope objective lens according to the invention that comprise a small number of individual lens components while still providing favorable correction of aberrations (especially flatness of image surface) over the full image height.

In addition, microscope objective lenses as exemplified by Example Embodiments 3 and 4 have a sufficiently long working distance and can favorably correct aberrations arising from use of a cover glass or other transparent body having variable thickness.

EXAMPLE EMBODIMENTS 5 AND 6

In microscope objective lenses as exemplified by Example Embodiments 5 and 6, the first lens group G1 consists of a single cemented lens having positive refractive power. The cemented lens in the first lens group consists of, from the specimen side, a negative lens and a positive lens. The positive lens has a convex surface facing the image side. The second lens group G2 consists of a single cemented lens having positive refractive power. The cemented lens in the second group consists of, from the specimen side, a negative lens and a positive lens, and the cemented surface has a negative refractive power. The third lens group G3 comprises two cemented positive lenses and optionally a single positive lens preferably located on the specimen side of the two cemented positive lenses. Each cemented lens of the third lens group consists of a negative lens and a positive lens, and the two positive lenses of the cemented lenses face each other. The fourth lens group G4 consists of a cemented negative lens consisting of, from the specimen side, a positive lens cemented to a negative lens having a concave surface facing the image side.

The second lens group G2 is movable on the optical axis so as to negate spherical aberrations caused by a transparent body (e.g., cover glass) of variable thickness situated between the specimen and the objective lens. More specifically, when a transparent body (such as a cover glass or wall of a culture dish) having a thickness greater than expected is disposed between the specimen surface and the objective lens (thus lengthening the optical light path from the specimen to the objective lens), the second lens group G2 is moved toward the first lens group G1. When the transparent body has a thickness less than expected (thus shortening the optical light path from the specimen to the objective lens), the second lens group G2 is moved toward the third lens group G3.

In objective lenses as exemplified by Example Embodiments 5 and 6, the second lens group G2 lacks a strong refractive power. Consequently, moving the second lens group G2 on the optical axis causes substantially no change in the focal length of the objective lens.

Objective lenses as exemplified by Example Embodiments 5 and 6 preferably satisfy conditional expression (14):

$$8 < f_2/f \quad (14)$$

wherein $f_2$ is the focal length of the second lens group G2, and f is the focal length of the objective lens. Falling outside the range of conditional expression (14) would cause the refractive power of the second lens group to be too large to prevent substantial changes in the focal length of the objective lens whenever the axial position of the second lens group is adjusted.

Objective lenses as exemplified by Example Embodiments 5–6 also preferably satisfy conditional expression (15):

$$|r_{2,1}|/f > 10 \quad (15)$$

wherein $r_{2,1}$ is the radius of curvature of the lens surface, in the second lens group, that is closest to the object (specimen) side. Falling outside the range of conditional expression (15) would increase the refractive function of the lens surface, in the second lens group, that is closest to the object side. In such a situation, it would be impossible to favorably correct aberrations by axially moving the second lens group, and movement of the second lens group would yield an unacceptable change in the focal length of objective lens.

Objective lenses as exemplified by Example Embodiments 5 and 6 also preferably satisfy conditional expression (16) so as to permit fine control of image-surface curvature aberrations:

$$-10 < r_{1,1}/f < -2 \quad (16)$$

wherein $r_{1,1}$ is the radius of curvature of the lens surface, in the first lens group, that is closest to the object (specimen) side. Falling below the lower limit of conditional expression (16) would result in $r_{1,1}$ being too large to provide a Petzval's sum suitable for providing flatness of the image surface produced by the objective lens. Exceeding the upper limit of conditional expression (16) would result in $r_{1,1}$ being too small to provide a Petzval's sum suitable for providing flatness of the image surface produced by the objective lens.

Objective lenses as exemplified by Example Embodiments 5–6 also preferably satisfy conditional expression (17) in order to satisfactorily control chromatic aberrations of magnification:

$$60 < V_{4n} \quad (17)$$

wherein $V_{4n}$ is the Abbe number (relative to d-line light; $\lambda = 586.56$ nm) of the lens, in the fourth lens group, that is closest to the image side. Falling outside the range of conditional expression (17) would cause chromatic aberrations of magnification to be over-corrected.

Objective lenses as exemplified by Example Embodiments 5–6 also preferably satisfy conditional expression (18) in order to provide sufficient control of image-surface curvature aberrations:

$$-7 < f_4/f < -3 \quad (18)$$

wherein $f_4$ is the focal length of the fourth lens group. Falling below the lower limit of conditional expression (18) would result in the Petzval's sum of the objective lens being too large, causing unacceptable degradation of the image-surface curvature.

Hence, objective lenses as exemplified by Example Embodiments 5–6 provide favorable correction of aberrations while employing a minimal number of constituent lenses.

Figure 26:
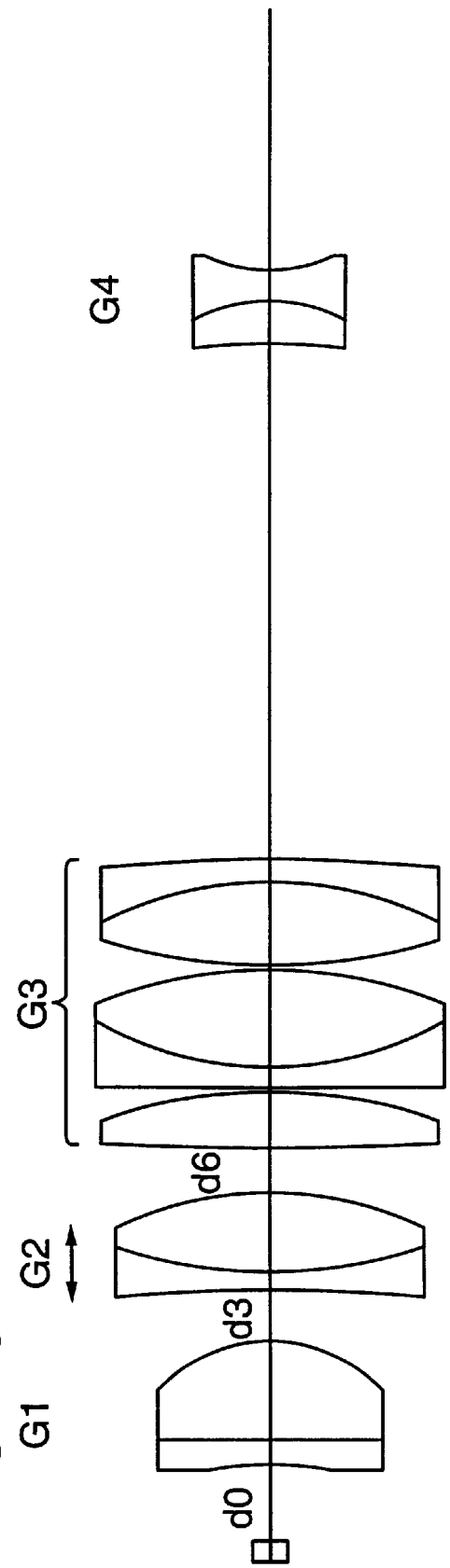
FIG. 26 is a schematic optical diagram of a microscope objective lens according to Example Embodiment 5.

FIGS. 26 and 27 depict the optical configurations of Example Embodiments 5 and 6, respectively. Physical dimensions of these example embodiments are listed in Tables 15 and 17, respectively, below. In Tables 15 and 17, the left-hand column of numbers refers to surface numbers, in order from the object (specimen) side; curvature radii are denoted "r"; axial distances between adjacent surfaces are denoted "d", do is the working distance, refractive indices (relative to d-line light; $\lambda = 587.6$ nm) are denoted "$n_D$", Abbe numbers are denoted by "$V_D$"; and magnification is denoted by "$\beta$".

TABLE 15

(Example Embodiment 5)

Overall Specifications $\beta = 40x$     $d_0$ = variable
NA = 0.6     f = 5.0 mm Lens Specifications

| Surface No. | r (mm) | d (mm) | $n_D$ | $V_D$ | Lens Group |
|---|---|---|---|---|---|
| 1 | −19.6043 | 1.40 | 1.5268 | 51.35 | G1 |
| 2 | 0 | 4.50 | 1.6030 | 65.42 | G1 |
| 3 | −7.4565 | Variable | | | G1 |
| 4 | −81.0470 | 0.9 | 1.7195 | 53.11 | G2 |
| 5 | 24.6204 | 3.7 | 1.4875 | 70.41 | G2 |
| 6 | −17.5989 | Variable | | | G2 |
| 7 | 136.5980 | 2.70 | 1.4978 | 82.52 | G3 |
| 8 | −23.5021 | 0.20 | | | G3 |
| 9 | 0 | 0.9 | 1.6200 | 36.27 | G3 |
| 10 | 17.2013 | 4.60 | 1.4339 | 95.57 | G3 |
| 11 | −23.5021 | 0.2 | | | G3 |
| 12 | 28.0630 | 3.90 | | | G3 |
| 13 | −19.7307 | 1.00 | 1.6127 | 44.41 | G3 |
| 14 | −124.3410 | 24.25 | | | G3 |
| 15 | −40.9000 | 2.00 | 1.6727 | 32.17 | G4 |
| 16 | −8.3780 | 1.50 | 1.4875 | 70.41 | G4 |
| 17 | 8.8313 | 150.0 | | | G4 |

With respect to Example Embodiment 5, Table 16 shows representative values of the axial distances on both sides of the second lens group G2 resulting from use of a transparent body ("cover glass", abbreviated "CG") having different thicknesses (i.e., 1.2 mm, 0 mm, and 2.0 mm).

TABLE 16

(Example Embodiment 5)

| | Cover Glass Thickness | | |
|---|---|---|---|
| d | 1.20 mm | 0 mm | 2.00 mm |
| $d_0$ | 3.48 mm | 4.06 mm | 3.10 mm |
| $d_3$ | 2.06 mm | 4.05 mm | 0.45 mm |
| $d_6$ | 2.44 mm | 0.45 mm | 4.05 mm |

Further with respect to Example Embodiment 5, FIGS. 28–30 depict curves for spherical aberration obtained when the cover glass thickness was 1.2 mm, 0 mm, and 2.0 mm, respectively. In FIGS. 28–30, NA is the numerical aperture, the curve labeled "c" was obtained using c-line light ($\lambda$=656.28 nm), the curve labeled "d" was obtained using d-line light ($\lambda$=587.56 nm), the curve labeled "f" was obtained using f-line light ($\lambda$=486.13 nm), and the curve labeled "g" was obtained using g-line light ($\lambda$=435.84 nm). FIGS. 28–30 indicate that Example Embodiment 5 exhibits favorable correction of spherical aberrations over a substantial range of cover-glass thicknesses.

In the following Table 17, physical data for Example Embodiment 6 are set forth. The variables listed are as described above with respect to Table 15.

TABLE 17

(Example Embodiment 6)

Overall Specifications $\beta = 40x$  $d_0 = $ variable
$NA = 0.55$  $f = 5.0$ mm Lens Specifications

| Surface No. | r (mm) | d (mm) | $n_D$ | $V_D$ | Lens Group |
|---|---|---|---|---|---|
| 1 | −40.0900 | 2.10 | 1.6127 | 44.41 | G1 |
| 2 | 517.1700 | 5.10 | 1.6030 | 65.42 | G1 |
| 3 | −7.0493 | Variable | | | G1 |
| 4 | 648.9400 | 1.00 | 1.7335 | 51.09 | G2 |
| 5 | 15.2611 | 4.05 | 1.5182 | 58.90 | G2 |
| 6 | −15.2611 | Variable | | | G2 |
| 7 | −208.5930 | 1.00 | 1.6200 | 36.27 | G3 |
| 8 | 18.14031 | 3.70 | 1.4978 | 82.52 | G3 |
| 9 | −19.8365 | 0.20 | | | G3 |
| 10 | 19.8365 | 3.70 | 1.4978 | 82.52 | G3 |
| 11 | −18.1403 | 1.00 | 1.6200 | 36.27 | G3 |
| 12 | 208.5930 | 23.90 | | | G3 |
| 13 | −93.8160 | 2.20 | 1.6727 | 32.17 | G4 |
| 14 | −9.8647 | 1.20 | 1.4875 | 70.41 | G4 |
| 15 | 9.4517 | 150.0 | | | G4 |

TABLE 18

(Example Embodiment 6)

| | Cover Glass Thickness | | |
|---|---|---|---|
| d | 1.20 mm | 0 mm | 2.00 mm |
| $d_0$ | 2.39 mm | 2.86 mm | 1.91 mm |
| $d_3$ | 1.80 mm | 3.46 mm | 0.53 mm |
| $d_6$ | 2.30 mm | 0.64 mm | 3.57 mm |

Figure 33:
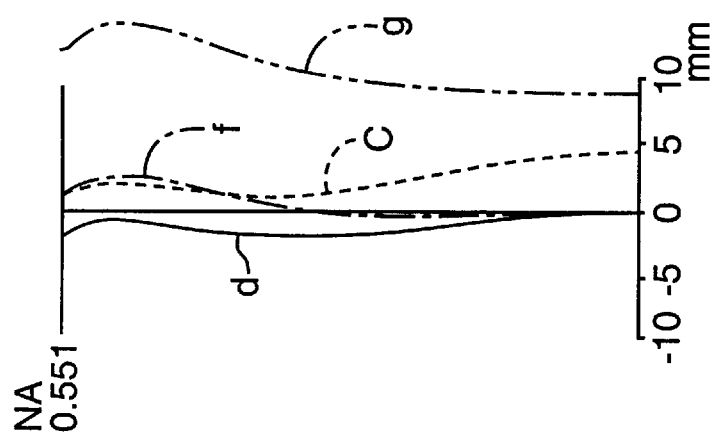
FIG. 33 provides plots of spherical aberration exhibited by the objective lens of Example Embodiment 6 as used with a cover glass having a thickness of 2.0 mm.
Figure 32:
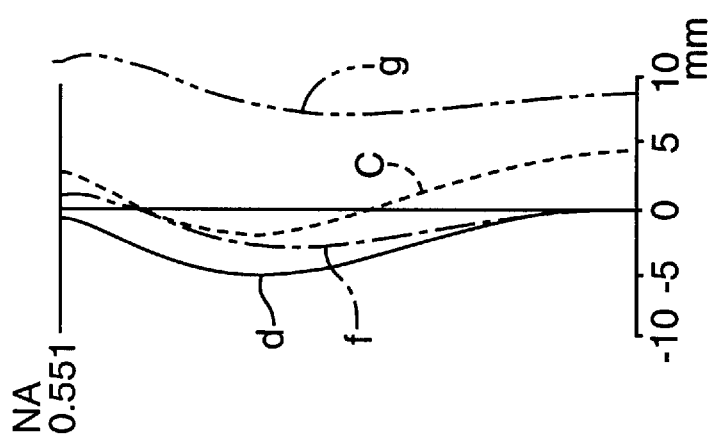
FIG. 32 provides plots of spherical aberration exhibited by the objective lens of Example Embodiment 6 as used with a cover glass having zero thickness.
Figure 31:
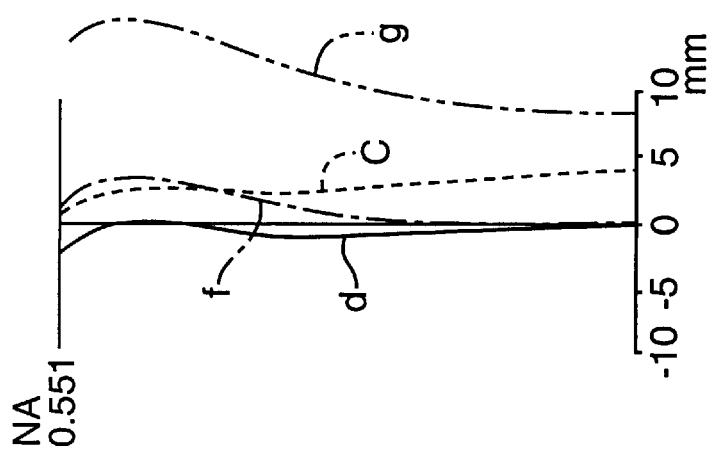
FIG. 31 provides plots of spherical aberration exhibited by the objective lens of Example Embodiment 6 as used with a cover glass having a thickness of 1.2 mm.

Further with respect to Example Embodiment 6, FIGS. 31–33 depict curves for spherical aberration obtained when the cover glass thickness was 1.2 mm, 0 mm, and 2.0 mm, respectively. In FIGS. 31–33, the variables and labels for curves are the same as described above with respect to FIGS. 28–30. FIGS. 31–33 indicate that Example Embodiment 6 exhibits favorable correction of spherical aberrations over a substantial range of cover-glass thicknesses.

Table 19 below lists representative values of the conditional expressions (14)–(18) for Example Embodiments 5 and 6.

TABLE 19

| Conditional Expression | Example Embod. 5 | Example Embod. 6 |
|---|---|---|
| (14) $f_2/f$ | 18.60 | 9.03 |
| (15) $|r_{2,1}|/f$ | 16.21 ($r_{2,1}$ is $r_4$) | 129.79 ($r_{2,1}$ is $r_4$) |
| (16) $r_1/f$ | −3.92 | −8.02 |
| (17) $V_{4n}$ | 70.41 | 70.41 |
| (18) $f_4/f$ | −4.02 | −5.03 |

In order to produce the data in FIGS. 28–30 and 31–33, the objective lenses of Example Embodiments 5 and 6 were used in combination with the imaging lens as shown in FIG. 25 and as described in Table 20.

TABLE 20

| Surface No. | r (mm) | d (mm) | $n_d$ | $V_d$ |
|---|---|---|---|---|
| 1 | 75.0430 | 5.10 | 1.6228 | 57.03 |
| 2 | −75.0430 | 2.00 | 1.7500 | 35.19 |
| 3 | 1600.5800 | 7.50 | | |
| 4 | 50.2560 | 5.10 | 1.6676 | 41.96 |
| 5 | −84.5410 | 1.80 | 1.6127 | 44.41 |
| 6 | 36.9110 | | | |

Hence, Example Embodiments 5 and 6 represent a microscope objective lens according to the invention that exhibits a long working distance and a flat image surface over the image plane. In addition, the objective lenses of Example Embodiments 5 and 6 exhibit favorable correction of spherical aberration arising from a cover glass or other transparent body having variable thickness.

Whereas the invention has been described in connection with several representative embodiments, it will be understood that the invention is not limited to those representative embodiments. On the contrary, the invention is intended to encompass all modifications, alternatives, and equivalents as may be included within the spirit and scope of the invention as defined by the appended claims.

What is claimed is:

1. A microscope objective lens, comprising in order on an optical axis from a specimen side to an image side:
   (a) first, second, third, and fourth lens groups;
   (b) the first lens group being positive and consisting of a negative lens cemented to a positive lens, the positive lens having a convex surface facing toward the image side;
   (c) the second lens group being positive and comprising a cemented lens having a cemented surface having negative refractive power;
   (d) the third lens group being positive and causing a ray bundle from the specimen, propagating divergently from the second lens group, to converge toward the optical axis;
   (e) the fourth lens group being negative and consisting of a positive lens cemented to a negative lens, the negative lens having a concave surface facing the image side;
   (f) the second lens group being movable on the optical axis relative to the first, third, and fourth lens groups in proportion to the thickness of an optically transparent body situated between the specimen and the first lens group so as to provide a correction of aberrations imparted by the transparent body; and (g) the objective lens satisfying a conditional expression as follows:

$$8<|f_2/f|$$

wherein $f_2$ is the focal length of the second lens group and f is the focal length of the objective lens.

2. The objective lens of claim 1, wherein the third lens group comprises, from the specimen side, first and second positive cemented lenses, the first cemented lens consisting of a negative lens cemented to a positive lens and the second cemented lens consisting of a positive lens cemented to a negative lens.

3. The objective lens of claim 2, wherein the third lens group further comprises a positive lens situated toward the specimen side relative to the first cemented lens.

4. The objective lens of claim 3, wherein the second lens group consists of a negative lens cemented to a positive lens.

5. The objective lens of claim 2, wherein the second lens group consists of a negative lens cemented to a positive lens.

6. The objective lens of claim 1, wherein the second lens group consists of a negative lens cemented to a positive lens.

7. A microscope objective lens, comprising in order on an optical axis from a specimen side to an image side:

(a) first, second, third, and fourth lens groups;

(b) the first lens group being positive and consisting of a negative lens cemented to a positive lens, the positive lens having a convex surface facing toward the image side;

(c) the second lens group being positive and comprising a cemented lens having a cemented surface having negative refractive power;

(d) the third lens group being positive and causing a ray bundle from the specimen, propagating divergently from the second lens group, to converge toward the optical axis;

(e) the fourth lens group being negative and consisting of a positive lens cemented to a negative lens, the negative lens having a concave surface facing the image side;

(f) the second lens group being movable on the optical axis relative to the first, third. and fourth lens groups in proportion to the thickness of an optically transparent body situated between the specimen and the first lens group so as to provide a correction of aberrations imparted by the transparent body;

(g) the objective lens satisfying a conditional expression as follows:

$$8<|f_2/f|$$

wherein $f_2$ is the focal length of the second lens group and f is the focal length of the objective lens; and (h) the objective lens further satisfying a conditional expression as follows:

$$-10<r_1/f<-2$$

wherein $r_1$ is the curvature radius of a surface, closest to the image side, in the first lens group.

8. The objective lens of claim 7, further satisfying condition expressions as follows:

$$60<V_{4n}$$

$$-7<f_4/f<13$$

wherein $V_{4n}$ is the Abbe number, relative to d-line light, of the negative lens of the fourth lens group, and $f_4$ is the focal length of the fourth lens group.

9. The objective lens of claim 1, further satisfying condition expressions as follows:

$$60<V_{4n}$$

$$-7<f_4/f<13$$

wherein $V_{4n}$ is the Abbe number, relative to d-line light, of the negative lens of the fourth lens group, and $f_4$ is the focal length of the fourth lens group.

10. The objective lens of claim 1, further satisfying a conditional expression as follows:

$$-10<r_{1,1}/f<-2$$

wherein $r_{1,1}$ is the radius of curvature of the lens surface, of the negative lens in the first lens group, that is closest to the specimen side.

11. The objective lens of claim 10, further satisfying a conditional expression as follows:

$$|r_{2,1}|/f \geq 10$$

wherein $r_{2,1}$ is the radius of curvature of the lens surface, in the second lens group, that is closest to the specimen side.

12. The objective lens of claim 1, further satisfying a conditional expression as follows:

$$|r_{2,1}|/f \geq 10$$

wherein $r_{2,1}$ is the radius of curvature of the lens surface, in the second lens group, that is closest to the specimen side.

13. The objective lens of claim 7, further satisfying a conditional expression as follows:

$$-10<r_{1,1}/f<-2$$

wherein $r_{1,1}$ is the radius of curvature of the lens surface, of the negative lens in the first lens group, that is closest to the specimen side.

14. The objective lens of claim 13, further satisfying a conditional expression as follows:

$$|r_{2,1}|/f \geq 10$$

wherein $r_{2,1}$ is the radius of curvature of the lens surface, in the second lens group, that is closest to the specimen side.

15. The objective lens of claim 1, further satisfying conditional expressions as follows:

$$-10<r_1/f<-2$$

$$60<V_{4n}$$

$$-7<f_4/f<13$$

$$|r_{2,1}|/f \geq 10$$

$$-10<r_{1,1}/f<-2$$

wherein $r_1$ is the curvature radius of a surface, closest to the image side, in the first lens group; $V_{4n}$ is the Abbe number, relative to d-line light, of the negative lens of the fourth lens group; $f_4$ is the focal length of the fourth lens group; $r_{2,1}$ is the radius of curvature of the lens surface, in the second lens group, that is closest to the specimen side; and $r_{1,1}$ is the radius of curvature of the lens surface, of the negative lens in the first lens group, that is closest to the specimen side.

16. A microscope objective lens, comprising in order on an optical axis from a specimen side to an image side:

(a) first, second, third, and fourth lens groups;

(b) the first lens group being positive and consisting of a negative lens cemented to a positive lens, the positive lens having a convex surface facing toward the image side;

(c) the second lens group being positive and comprising a cemented lens having a cemented surface having negative refractive power;

(d) the third lens group being positive and causing a ray bundle from the specimen, propagating divergently from the second lens group, to converge toward the optical axis;

(e) the fourth lens group being negative and consisting of a positive lens cemented to a negative lens, the negative lens having a concave surface facing the image side;

(f) the second lens group being movable on the optical axis relative to the first, third, and fourth lens groups in proportion to the thickness of an optically transparent body situated between the specimen and the first lens group so as to provide a correction of aberrations imparted by the transparent body; and (g) the objective lens satisfying a conditional expression as follows:

$$8<|f_2/f|<50$$

wherein $f_2$ is the focal length of the second lens group and f is the focal length of the objective lens.

17. The objective lens of claim 16 further satisfying a conditional expression $8<|f_2/f|<24$.

18. The objective lens of claim 16, wherein the third lens group comprises, from the specimen side, first and second positive cemented lenses, the first cemented lens consisting of a negative lens cemented to a positive lens and the second cemented lens consisting of a positive lens cemented to a negative lens.

19. The objective lens of claim 18, wherein the third lens group further comprises a positive lens situated toward the specimen side relative to the first cemented lens.

20. The objective lens of claim 19, wherein the second lens group consists of a negative lens cemented to a positive lens.

* * * * *

UNITED STATES PATENT AND TRADEMARK OFFICE
CERTIFICATE OF CORRECTION

PATENT NO. : 5,940,220  
DATED : August 17, 1999  
INVENTOR(S) : Suenaga et al.

Page 1 of 1

It is certified that error appears in the above-identified patent and that said Letters Patent is hereby corrected as shown below:

Specification:
Column 8,
Lines 46-47, conditional expressions (6) and (7) should read as follows:

$$-- \quad 2 < |(f_1/f)| < 3 \quad (6)$$
$$2 < |(r_1/f)| < 3 \quad (7) \quad --$$

Column 12,
Line 10, "69.38" should be -- 69.98 --.

Column 19,
Line 31, conditional expression (15) should read as follows:

$$-- \quad |r_{2,1}|/f \geq 10 \quad (15) \quad --$$

Signed and Sealed this

Twenty-first Day of August, 2001

Attest:

*Nicholas P. Godici*

NICHOLAS P. GODICI
*Attesting Officer*    *Acting Director of the United States Patent and Trademark Office*